United States Patent
Matsumura et al.

(10) Patent No.: US 6,896,641 B2
(45) Date of Patent: May 24, 2005

(54) METHOD OF CONTROLLING AUTOMOBILE, AUTOMOBILE CONTROL APPARATUS, TRANSMISSION, METHOD OF CONTROLLING TRANSMISSION AND VEHICLE SYSTEM

(75) Inventors: Tetsuo Matsumura, Hitachinaka (JP); Naoyuki Ozaki, Hitachinaka (JP); Kinya Fujimoto, Hitachinaka (JP); Tomoaki Nitta, Musashino (JP)

(73) Assignees: Hitachi, Ltd., Tokyo (JP); Fuji Heavy Industries Ltd., Tokyo (JP)

( * ) Notice: Subject to any disclaimer, the term of this patent is extended or adjusted under 35 U.S.C. 154(b) by 0 days.

(21) Appl. No.: 10/318,152

(22) Filed: Dec. 13, 2002

(65) Prior Publication Data

US 2003/0176257 A1 Sep. 18, 2003

(30) Foreign Application Priority Data

Mar. 15, 2002 (JP) ........................................ 2002-071396

(51) Int. Cl.$^7$ ............................................... B60K 41/04
(52) U.S. Cl. ....................... 477/115; 74/335; 74/336 R; 74/339
(58) Field of Search ...................... 74/335, 339, 336 R; 477/115

(56) References Cited

U.S. PATENT DOCUMENTS

| | | | | |
|---|---|---|---|---|
| 4,622,866 A | * | 11/1986 | Ito et al. ...................... | 477/122 |
| 6,095,001 A | * | 8/2000 | Ruehle et al. ................. | 74/331 |
| 6,514,172 B2 | * | 2/2003 | Kayano et al. ............. | 477/110 |
| 6,546,826 B2 | * | 4/2003 | Suzuki ........................ | 74/335 |
| 6,588,292 B2 | * | 7/2003 | Yamasaki et al. ............. | 74/340 |
| 6,619,152 B2 | * | 9/2003 | Ochi et al. ..................... | 74/335 |
| 6,648,795 B2 | * | 11/2003 | Kobayashi .................... | 477/54 |
| 6,679,133 B1 | * | 1/2004 | Kayano et al. ............... | 74/335 |
| 2002/0148311 A1 | * | 10/2002 | Kobayashi .................... | 74/339 |

FOREIGN PATENT DOCUMENTS

| | | | | |
|---|---|---|---|---|
| JP | 2703169 | 7/1994 | | |
| JP | 2002-174335 | 6/2002 | | |
| WO | WO 200032960 A1 | * | 6/2000 | ........... F16H/3/083 |

* cited by examiner

Primary Examiner—Saul Rodriguez
Assistant Examiner—David D. Le
(74) Attorney, Agent, or Firm—Crowell & Moring LLP

(57) ABSTRACT

Effects caused by unevenness among drive power sources and transmission torque changing apparatus and aging effects in a vehicle transmission are controlled without using sensors. A power train control unit releases engine torque through an assist clutch to release at least a part of gear train transmission torque to shift a meshing clutch toward a release position. During the gear release, a load is applied in a direction in which the meshing clutch is shifted toward the release position, before the transmission torque of the gear train is completely released, and the meshing clutch is shifted to the release position when at least a part of the transmission torque of the gear trains is released.

14 Claims, 16 Drawing Sheets

FIG.3A

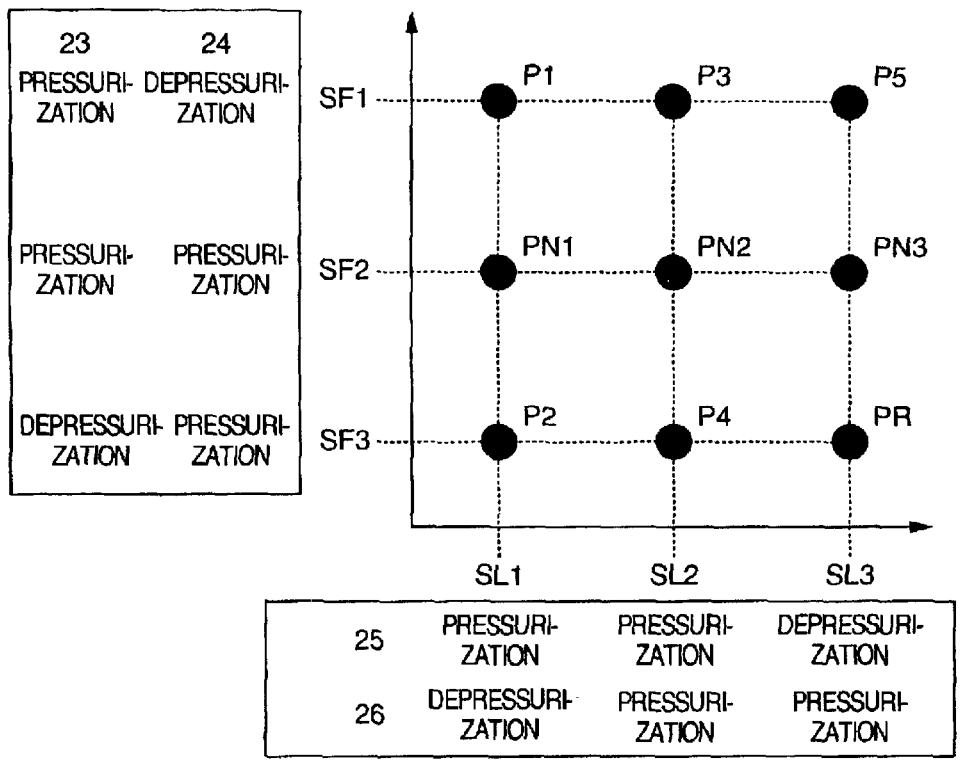

|  | 23 | 24 |
|---|---|---|
| SF1 | PRESSURIZATION | DEPRESSURIZATION |
| SF2 | PRESSURIZATION | PRESSURIZATION |
| SF3 | DEPRESSURIZATION | PRESSURIZATION |

|  | SL1 | SL2 | SL3 |
|---|---|---|---|
| 25 | PRESSURIZATION | PRESSURIZATION | DEPRESSURIZATION |
| 26 | DEPRESSURIZATION | PRESSURIZATION | PRESSURIZATION |

FIG.3B

|  | MESHING CLUTCH 1 ||| MESHING CLUTCH 2 ||| MESHING CLUTCH 3 |||
|---|---|---|---|---|---|---|---|---|---|
|  | 1 | N | 2 | 3 | N | 4 | 5 | N | R |
| FIRST SPEED SHIFT STAGE P1 | ○ |  |  |  | ○ |  |  | ○ |  |
| SECOND SPEED SHIFT STAGE P2 |  |  | ○ |  | ○ |  |  | ○ |  |
| THIRD SPEED SHIFT STAGE P3 |  | ○ |  | ○ |  |  |  | ○ |  |
| FOURTH SPEED SHIFT STAGE P4 |  | ○ |  |  |  | ○ |  | ○ |  |
| FIFTH SPEED SHIFT STAGE P5 |  | ○ |  |  | ○ |  | ○ |  |  |
| REVERSE STAGE PR |  | ○ |  |  | ○ |  |  |  | ○ |

METHOD OF CONTROLLING AUTOMOBILE, AUTOMOBILE CONTROL APPARATUS, TRANSMISSION, METHOD OF CONTROLLING TRANSMISSION AND VEHICLE SYSTEM

BACKGROUND OF THE INVENTION

1. Field of the Invention

The present invention relates to a method of controlling an automobile, an automobile control apparatus, a transmission a control apparatus for a transmission and a vehicle system, and in particular to a method of controlling an automobile, an automobile control apparatus, a transmission, a control apparatus for a transmission and a vehicle system which are appropriate for controlling an automatic transmission in a vehicle.

2. Related Art

An automobile incorporating a manual transmission is excellent in fuel consumption in comparison with an automobile incorporating a transmission using a torque converter. However, the associating operation between a clutch and an accelerator has been difficult upon a start of the automobile. Should this associating operation between the clutch and the accelerator be unsuccessful, a large shock would occur upon engagement of the clutch upon a start, or should the clutch pressure be insufficient, the engine speed would abruptly increase, that is, the so-called engine blow-up would be caused. Further, should the clutch be abruptly engaged when the engine speed is relatively low, or should the automobile be started on a slope, the engine would come to a stop, that is, the so-called engine stall would occur.

In order to eliminate the above-mentioned problem, there has been developed a system which uses a mechanism of a manual transmission in which the clutching operation and the gear change are automated, that is, an automated manual transmission (AMT).

However, the control upon a gear change with a conventional automated manual transmission would cause occurrence of cut-off of torque upon disengagement or engagement of the clutch, and as a result, the passenger would feel discomfort.

Accordingly, in order to avoid occurrence of cut-off of toque during a gear change, as disclosed in, for example, JP-B2-2703169, there has been known an automobile installed thereon a conventional automated transmission which incorporates an assist clutch serving as a transmitted torque changing means so as to control this assist clutch upon a gear change in order to effect engine speed synchronization and torque transmission.

In such an automobile, when a gear shift is started, at least a part of a torque inputted to a transmission is transmitted through the assist clutch in order to release a gear train through which a torque is transmitted by a meshing transmission means, and accordingly, the gear release is carried out in order to shift the meshing transmission means to a release position for release thereof. In order to carry out the gear release with no shock, a substantial part of an input torque should be transmitted by means of the assist clutch in order to shift the meshing transmission means to the release position for releasing gears with such a timing that the transmission torque through gear train is sufficiently released. Thus, after a lapse of a predetermined time from the time of a start-up of operation of the assist clutch is detected, a load is applied in a direction in which the meshing transmission means is shifted toward the release position, in order to carry out the control of gear release.

In order to carry out the gear release with no shock, it is required to transmit a substantial part of an input torque through the assist clutch, and then to shift the meshing transmission means to the release position with such a timing that the transmission torque through the gear train is sufficiently released. However, the start-up of operation of the assist clutch would be uneven due to unevenness among transmissions, aging effects or the like, and should the gear release be carried out with a timing deviated from an optimum timing, a stepwise torque difference would occur, and as a result, the gear change feeling would be unsatisfactory.

Thus, the applicant proposed, in JP-A-2002-174335, such an automatic transmission that a torque transmitted through the assist clutch is estimated or detected with the use of a sensor in order to detect an optimum timing for gear release, with which the torque transmitted through the gear train is sufficiently released, in accordance with the estimated or detected torque transmitted through the assist clutch, and accordingly, the meshing transmission means is shifted to the release position with this detected optimum timing.

However, the method proposed in the JP-A-2002-174335, an additional sensor is required so as to cause a problem of increasing the cost of the apparatus.

SUMMARY OF THE INVENTION

An object of the present invention is to provide a method of controlling an automobile, an automobile control apparatus, a transmission, a transmission control apparatus and a vehicle system, which can reduce detrimental effects caused by unevenness among transmissions, aging effect and the like.

(1) To the end, according to the present invention, there is provided a method of controlling an automobile having a drive power source for producing a drive power, and a gear transmission including a plurality of gear trains and a plurality of torque transmission means provided between an input shaft and an output shaft of the transmission, at least one of the torque transmission means being a transmission torque changing means while at least one thereof is a meshing transmission means so that shifting from one gear train to another gear train is made by controlling the transmission torque changing means, wherein upon a gear release in which at least a part of a torque from the drive power source is transmitted by the transmission torque changing means so as to release a part of transmission torque of the gear trains in order to shift the meshing transmission means to a release position for releasing gears, a load is applied in a direction in which the meshing transmission means is shifted toward the release position, before all transmission torque of the gear trains are released, and the meshing transmission means is shifted to the release position when at least a part of the transmission torque of the gear trains is released.

With the above-mentioned method, it is possible to reduce the effect caused by unevenness among power sources and transmission torque means and aging effects without using sensors.

(2) In the above-mentioned aspect (1) of the present invention, the load applied to the meshing transmission means is applied preferably before at least a part of the transmission torque of the gear trains is released.

(3) In the above-mentioned aspect (1) of the present invention, the load applied to the meshing transmission means is applied preferably at the time when release of at least a part of the transmission torque of the gear trains is started.

(4) In the above-mentioned aspect (1) of the present invention, preferably, a slope of rise-up of the transmission torque of the transmission torque changing means is set and a slope of rise-up of a load of the meshing transmission means is set, and accordingly, the load and the transmission torque of the transmission torque changing means are raised in the direction in which the meshing transmission means is shifted to the release position, in accordance with the slopes which are set as mentioned above.

(5) In the above-mentioned aspect (1) of the present invention, preferably, a slope of rise-up of a transmission torque of the transmission torque changing means is set to be not less than that of a load of the meshing transmission means.

(6) In the above-mentioned aspect (1) of the present invention, preferably, a maximum duration for gear release of the meshing transmission means is set while a duration from the time when the gear release of the meshing transmission means is detected, and if the duration from the time of starting the gear release exceeds the maximum duration, the load with which the meshing transmission means is shifted toward the release position is increased.

(7) To the end, according to the present invention, there is provided a method of controlling an automobile having a drive power source for producing a drive power, a gear transmission incorporating a plurality of gear trains, two transmission torque changing means coupled to an input shaft of the transmission, and a plurality of torque transmission means incorporated between the input shaft and an output shaft of the transmission, at least one of the torque transmission means being a meshing transmission means, in which shifting from one gear train to another gear train is carried out by controlling the transmission torque changing means, wherein upon gear release in which a part of a torque from the drive power source is transmitted by the transmission torque changing means so as to release at least a part of a transmission torque of the gear trains in order to shift the meshing transmission means to a release position for releasing gears, a load is applied in the direction in which the meshing transmission means is shifted toward the release position before all transmission torque of the gear trains are released, and accordingly, when at least a part of the transmission torque of the gear trains is released, the meshing transmission means is shifted to the release position.

With this method, it is possible to reduce affection caused by unevenness among drive sources and transmission torque changing means and aging effect thereof without using sensors.

(8) To the end, according to the present invention, there is provided a method of controlling an automobile having a drive power source for producing a drive power, a gear transmission incorporating a plurality of gear trains, a plurality of torque transmission means incorporated between an input shaft and an output shaft of the transmission, at least one of the torque transmission means being a transmission torque changing means while at least one thereof is a meshing transmission means, shifting from one gear train to another gear train is carried out by controlling a transmission torque of the transmission torque changing means and a load of the meshing transmission means by means of electric signals, wherein upon gear release in which at least a part of a torque from the drive power source is transmitted by the transmission torque changing means so as to release at least a part of a transmission torque of a gear train meshed with the meshing transmission means in order to shift the meshing transmission means toward a release position so as to release the same, an electric signal to the meshing transmission means is excited so that a load is applied in a direction in which the meshing transmission means is shifted toward its release position while an electric signal to the transmission torque changing means is excited so that at least a part of the torque from the drive power source is transmitted by the transmission torque changing means, and when at least a part of a transmission torque of the gear train meshed with the meshing transmission means is released, the meshing transmission means is shifted to the release position.

With this method, it is possible to reduce affection caused by unevenness among drive sources and transmission torque changing means and aging effect thereof without using sensors.

(9) To the end according to the present invention, there is provided a method of controlling an automobile comprising a drive power source for producing a drive power, a gear transmission incorporating a plurality of gear trains, and a plurality of torque transmission means incorporated between an input shaft and an output shaft of the transmission, at least one of the torque transmission means being a transmission torque changing means while at least one thereof is a meshing transmission means so that shifting from one gear train to another gear train is carried out by controlling the transmission torque changing means, wherein during a gear release in which a torque from the above-mentioned drive power source is gradually transmitted by the transmission torque changing means so as to gradually release a transmission torque of the gear trains in order to shift the meshing transmission means to a release position for releasing gears, a load which is not less than a total resisting force for shifting the meshing transmission means during the gear release, is previously applied in a direction in which the meshing transmission means is shifted to the release position.

With this method, it is possible to reduce affection caused by unevenness among drive sources and transmission torque changing means and aging effect thereof without using sensors.

(10) In the above-mentioned aspect (9) of the present invention, the slope of rise-up of the transmission torque of the above-mentioned transmission toque changing means is set to be not less than that of rise-up of the load of the meshing transmission means.

(11) To the end, according to the present invention, there is provided an automobile control apparatus comprising a drive power source for producing a drive power, a gear transmission comprising a plurality of gear trains, a plurality of torque transmission means incorporated between an input shaft and an output shaft of the transmission and including a transmission torque changing means and a meshing transmission means, a gear change control means for controlling the transmission torque changing means so as to effect shifting from one gear train to another gear train, and a gear release control means for applying a load in a direction in which the meshing transmission means is shifted toward the release position before the entire transmission torque of the gear trains is released, during a gear release in which a part of a torque from the drive power source is transmitted by the transmission torque changing means so as to release a part of a transmission torque of gear trains in order to shift the meshing transmission means to a release position for releasing gears, and for shifting the meshing transmission means to the release position when at least a part of the transmission toque of the gear trains is released.

With this arrangement, it is possible to reduce affection caused by unevenness among drive sources and transmission torque changing means and aging effect thereof without using sensors.

(12) To the end according to the present invention, there is provided a method of controlling a transmission comprising a plurality of gear trains, a plurality of torque transmission means between an input shaft and an output shaft, at least one of the torque transmission means being a transmission torque changing means while at least one thereof is a meshing transmission means, shifting from one gear train to another gear train being carried out by controlling the transmission torque changing means, during a gear release in which at least a part of a torque from a drive power source is transmitted by the transmission torque changing means so as to release a part of a transmission torque of gear trains in order to shift the meshing transmission means toward a release position for releasing gears, a load is applied in a direction in which the meshing transmission means is shifted toward the release position, before the all transmission torque of the gear trains is released, and the meshing transmission means is shifted to the release position when at least a part of the transmission torque of the gear trains is released.

With this arrangement, it is possible to reduce affection caused by unevenness among drive sources and transmission torque changing means and aging effect thereof without using sensors.

(13) To the end, according to the present invention, there is provided a transmission having a plurality of gear trains, a plurality of torque transmission means incorporated between an input shaft and an output shaft, and including a transmission torque changing means and a meshing transmission means, shifting from one gear train to another gear train being carried out by controlling the meshing transmission means, and a gear release control means for applying a load in a direction in which the meshing transmission means is shifted toward the release position, before the all transmission torque of the gear trains is released, during a gear release in which at least a part of a torque from a drive power source is transmitted by the transmission torque changing means so as to release a part of a transmission torque of gear trains in order to shift the meshing transmission means toward a release position for releasing gears, and for shifting the meshing transmission means to the release position when at least a part of the transmission torque of the gear trains is released.

With this arrangement, it is possible to reduce affection caused by unevenness among drive sources and transmission torque changing means and aging effect thereof without using sensors.

(14) To the end, according to the present invention, a vehicle system comprising a drive power source for producing a drive power, a gear transmission incorporating a plurality of gear trains, a plurality of torque transmission means incorporated between an input shaft and an output shaft of the transmission and including a transmission torque changing means and a meshing transmission means, shifting from one gear train to another gear train being carried out by controlling the meshing transmission means, during a gear release in which at least a part of a torque from a drive power source is transmitted by the transmission torque changing means so as to release a part of a transmission torque of gear trains in order to shift the meshing transmission means toward a release position for releasing gears, a load is applied in a direction in which the meshing transmission means is shifted toward the release position, before the all transmission torque of the gear trains is released, and the meshing transmission means is shifted to the release position when at least a part of the transmission torque of the gear trains is released.

With this arrangement, it is possible to reduce affection caused by unevenness among drive sources and transmission torque changing means and aging effect thereof without using sensors.

The present invention will be described in detail in the form of preferred embodiments with reference to the accompanying drawings in which:

BRIEF DESCRIPTION OF THE ACCOMPANYING DRAWINGS

FIGS. 3A and 3B are views for explaining a meshing relationship between a clutch and a driven gear in an automobile control apparatus in an embodiment of the present invention;

Figure 4:
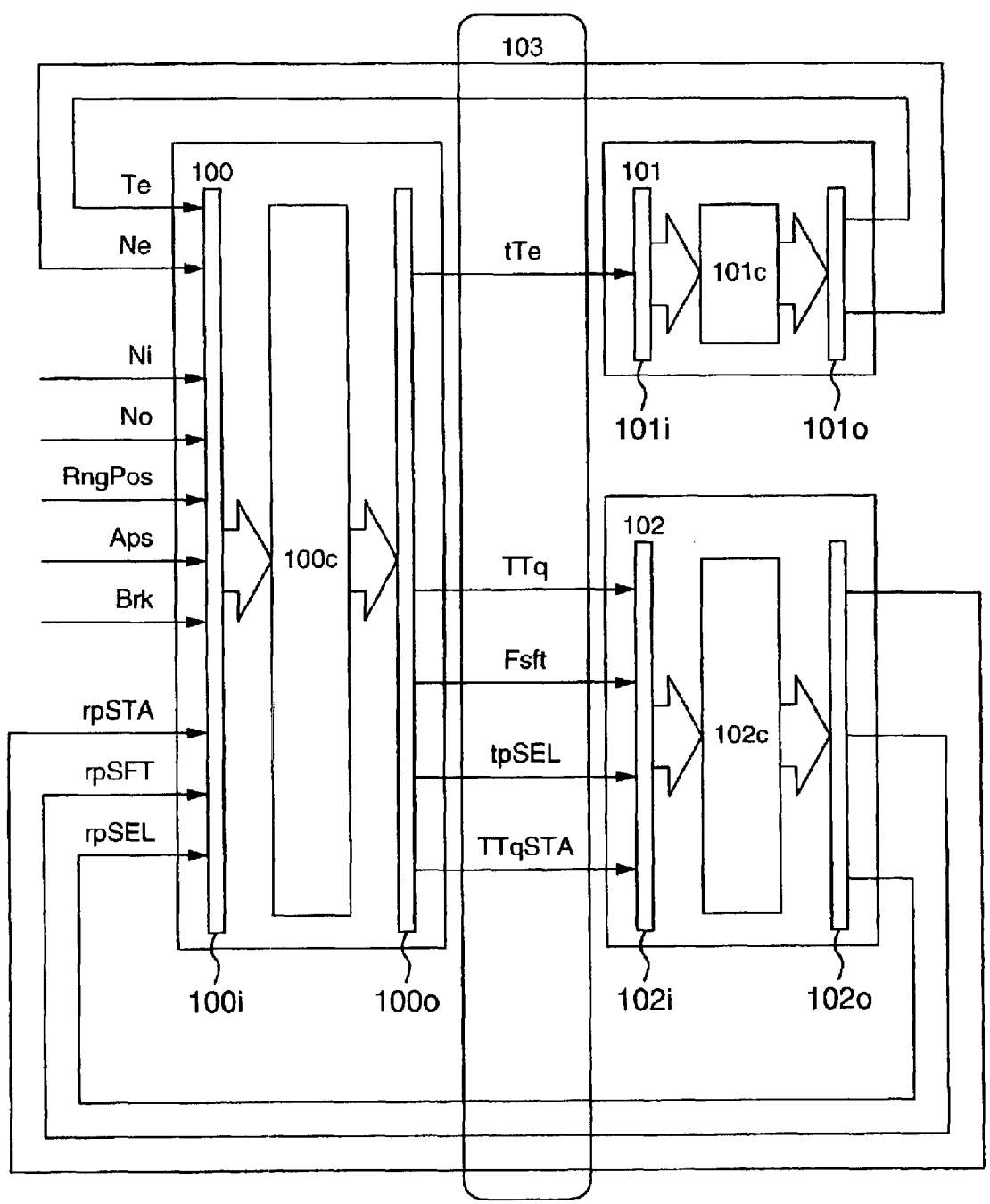
Figure 5:
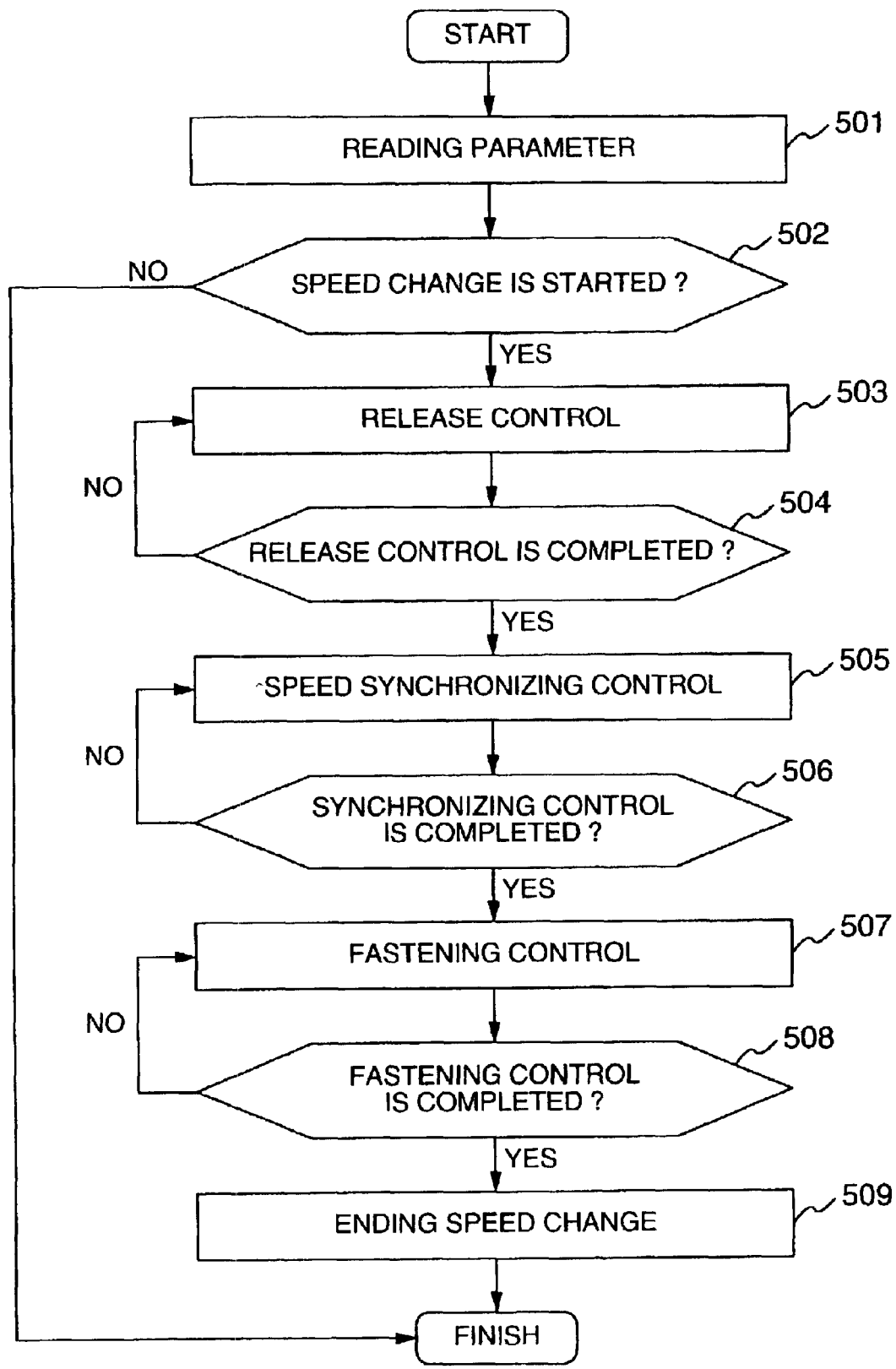
Figure 6:
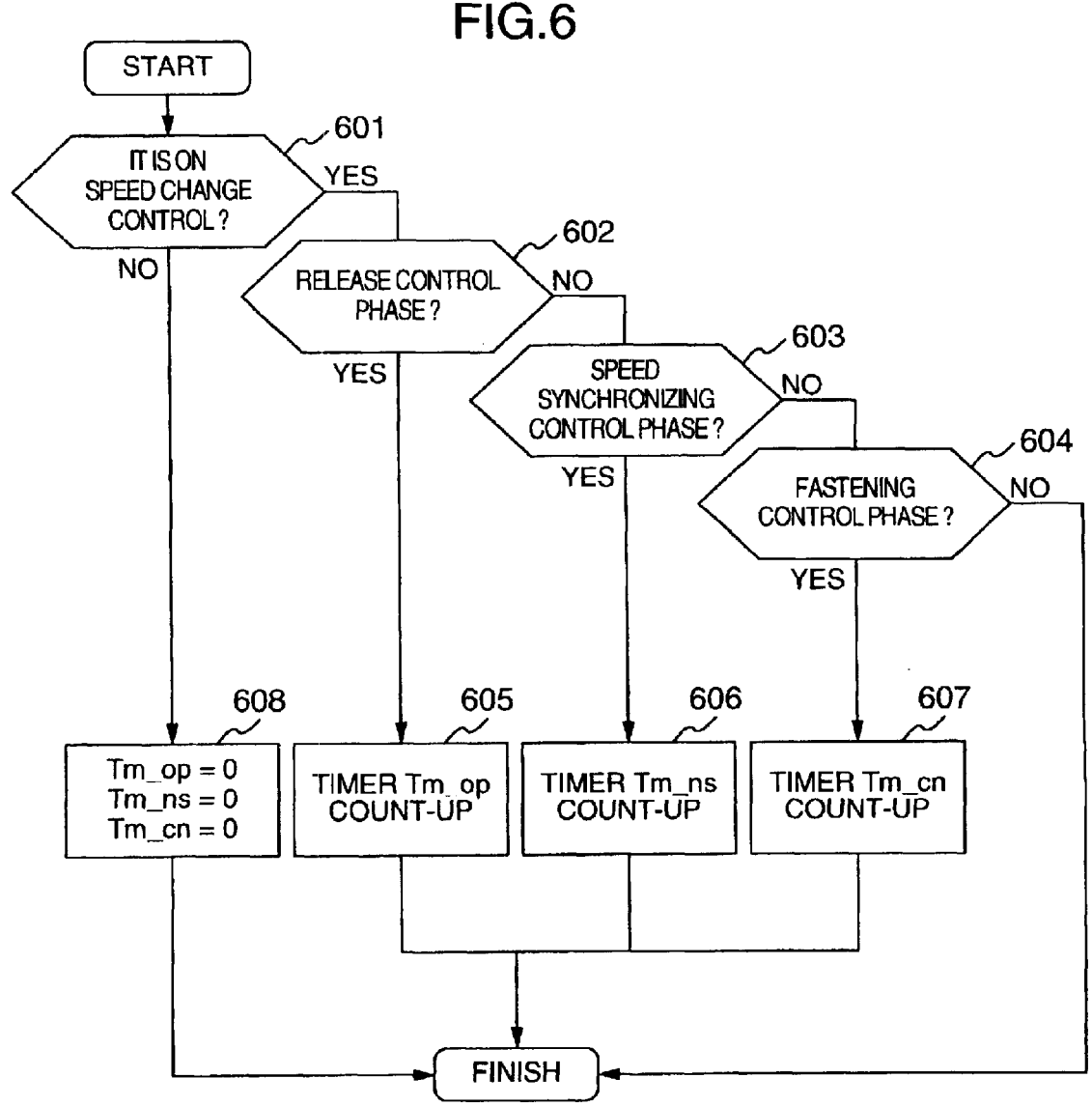
Figure 7:
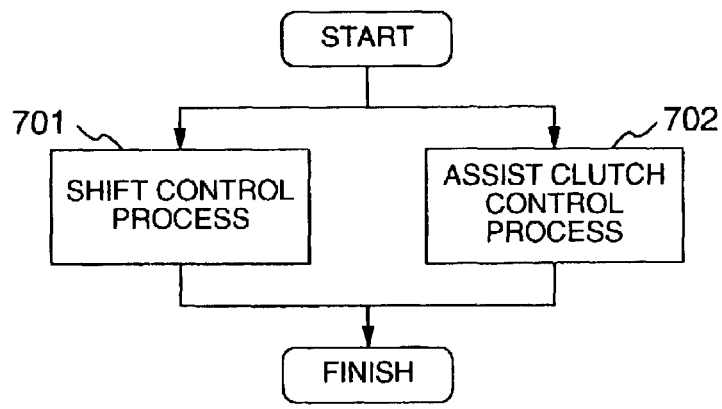
Figure 8:
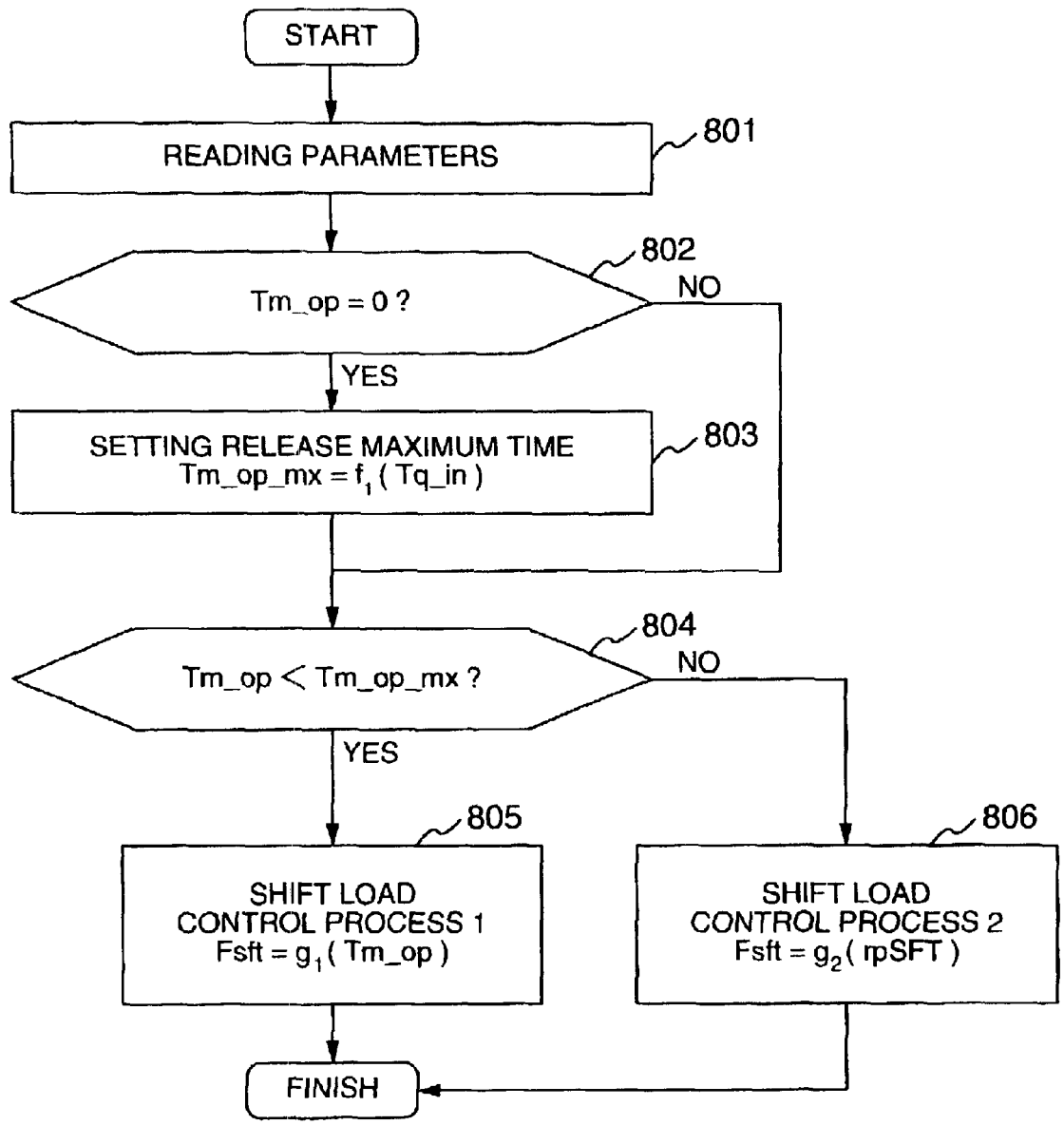
Figure 9A:
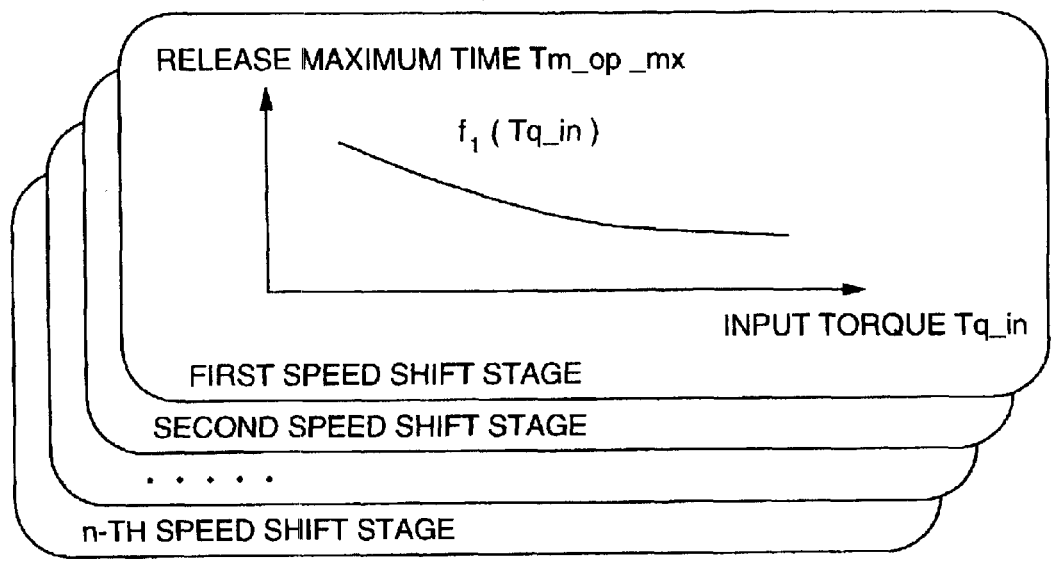
Figure 9B:
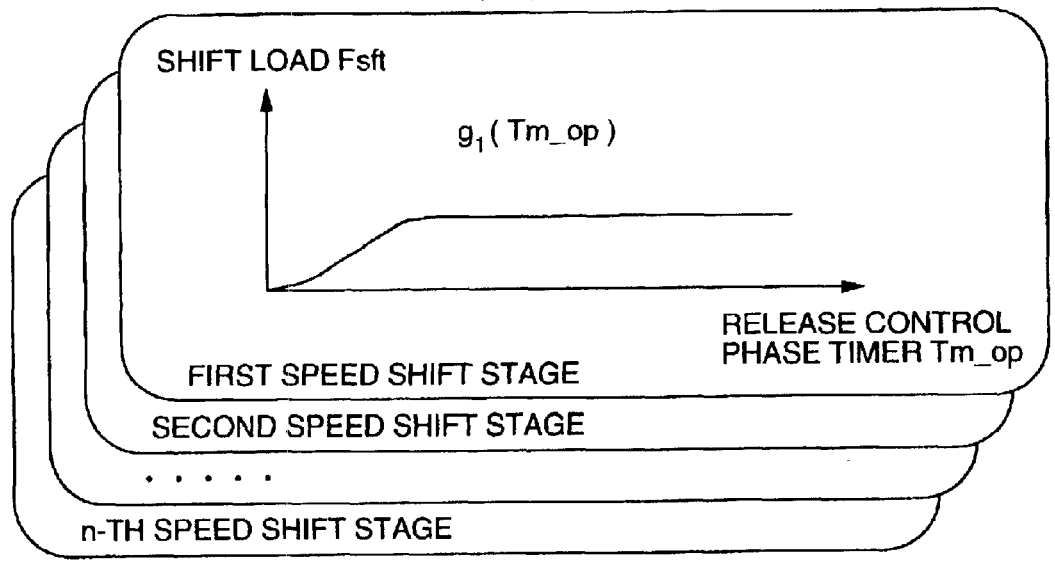
Figure 9C:
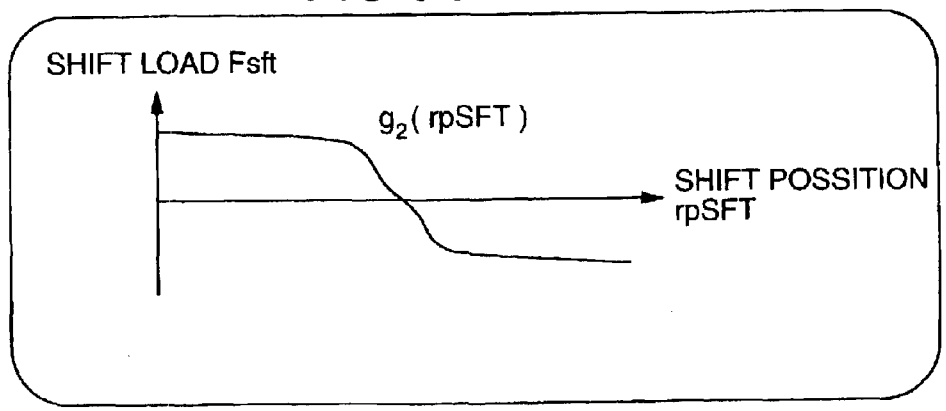
Figure 10:
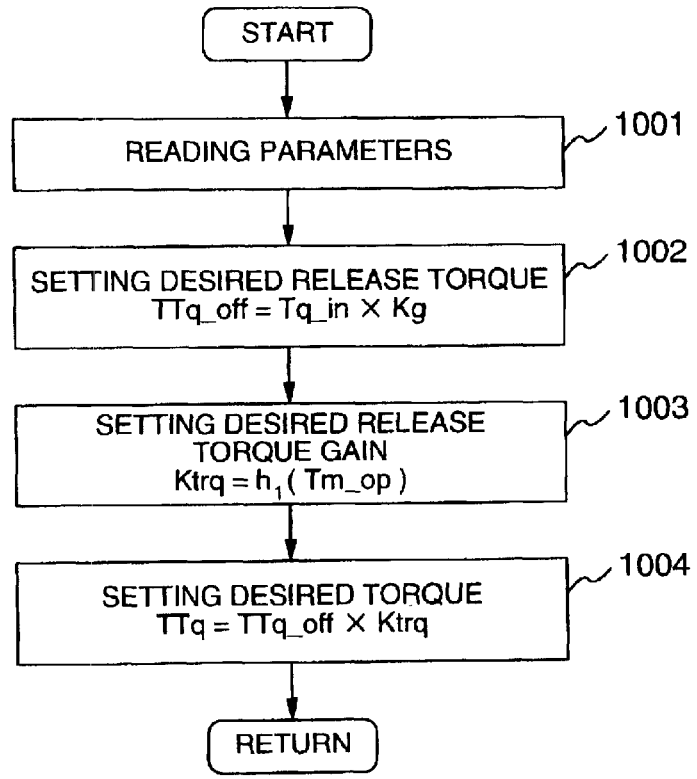
Figure 11:
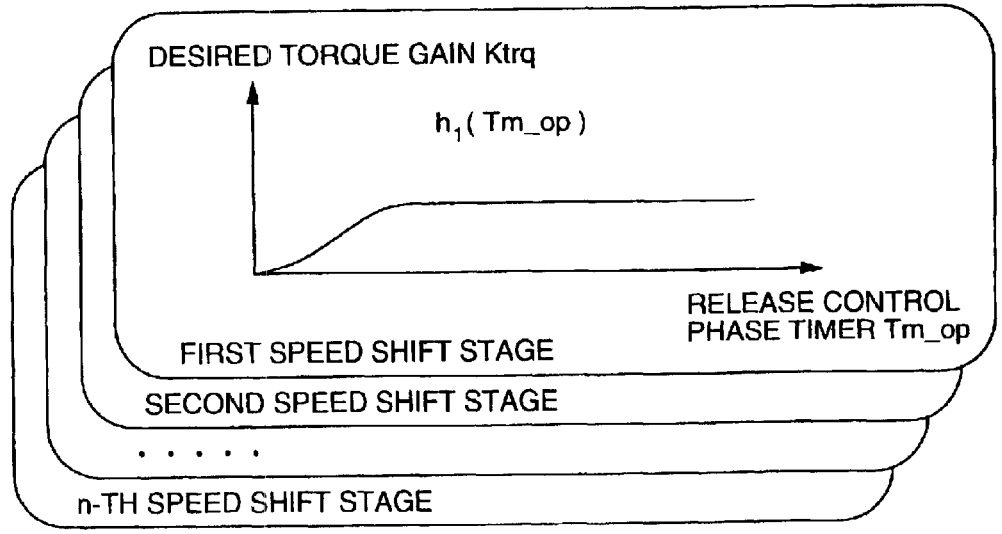
Figure 12:
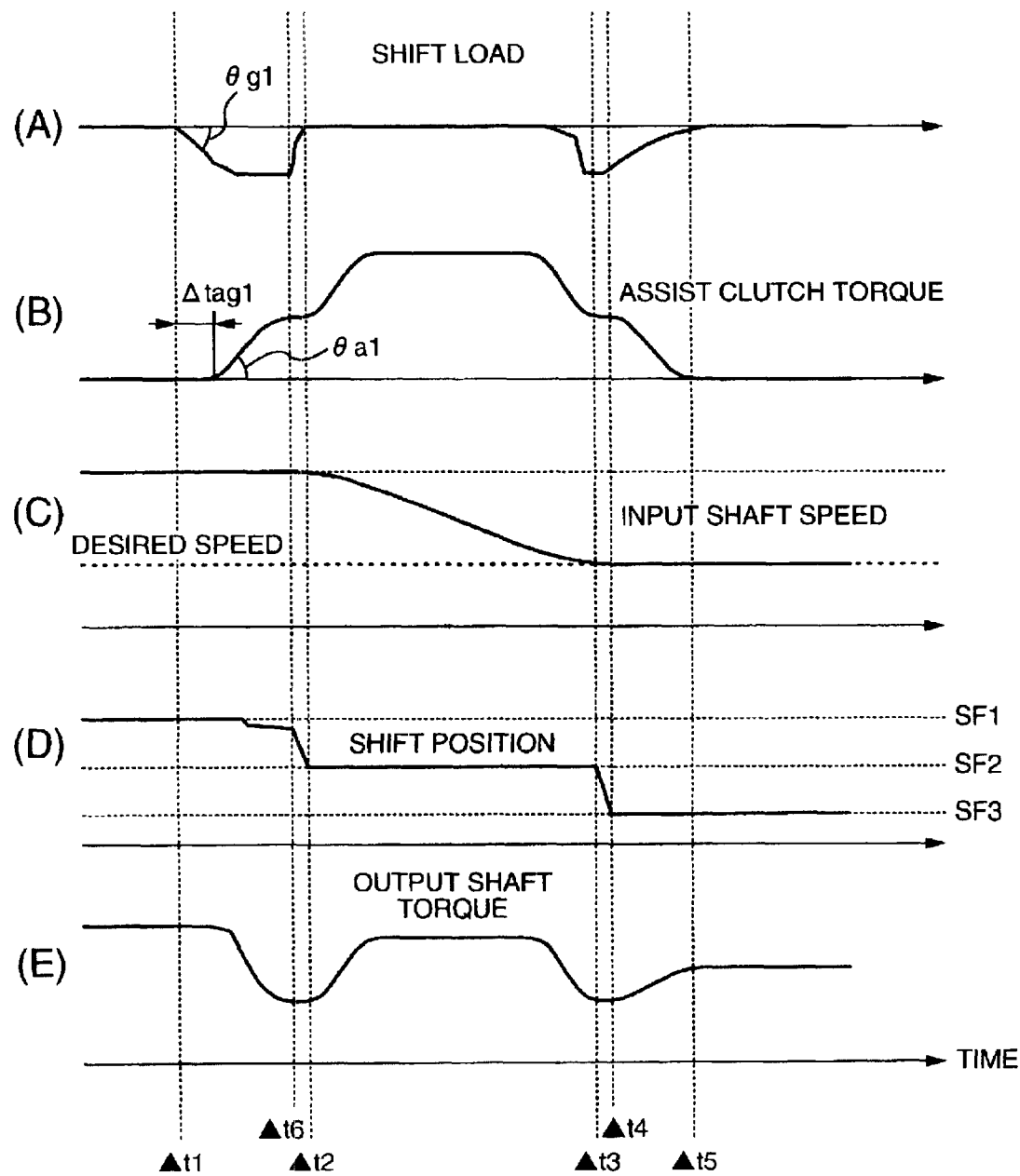
Figure 13:
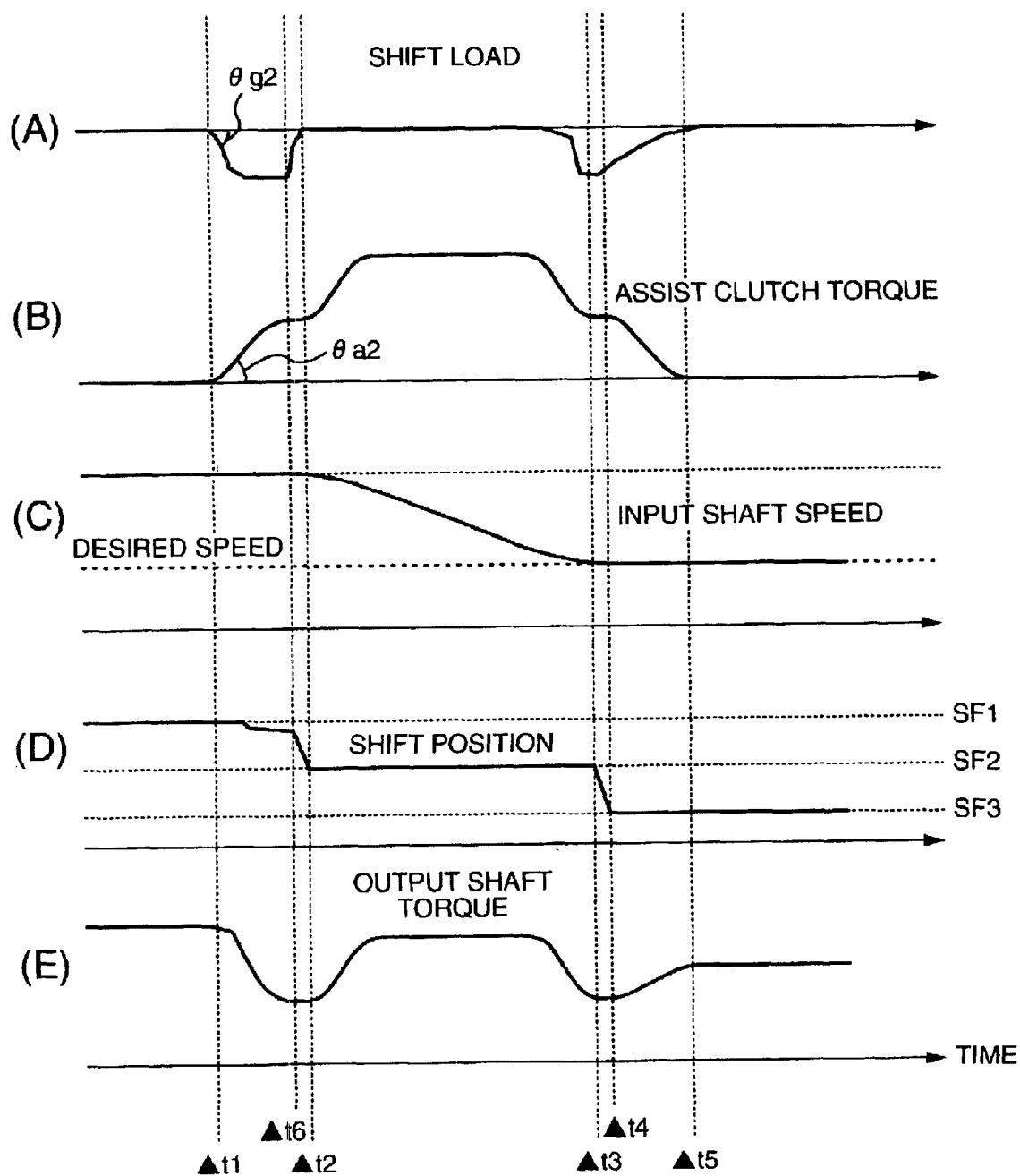
Figure 14:
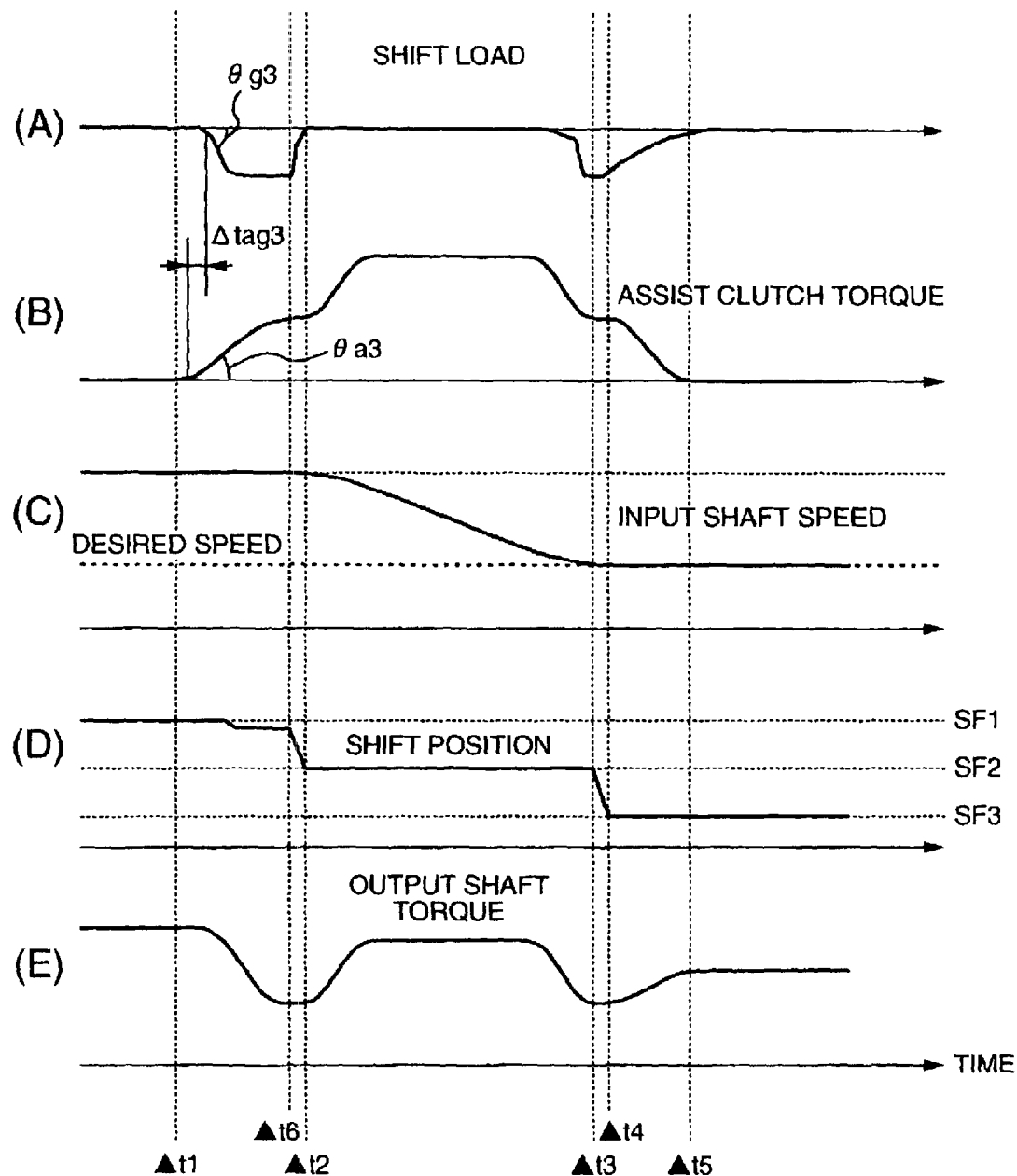
Figure 15:
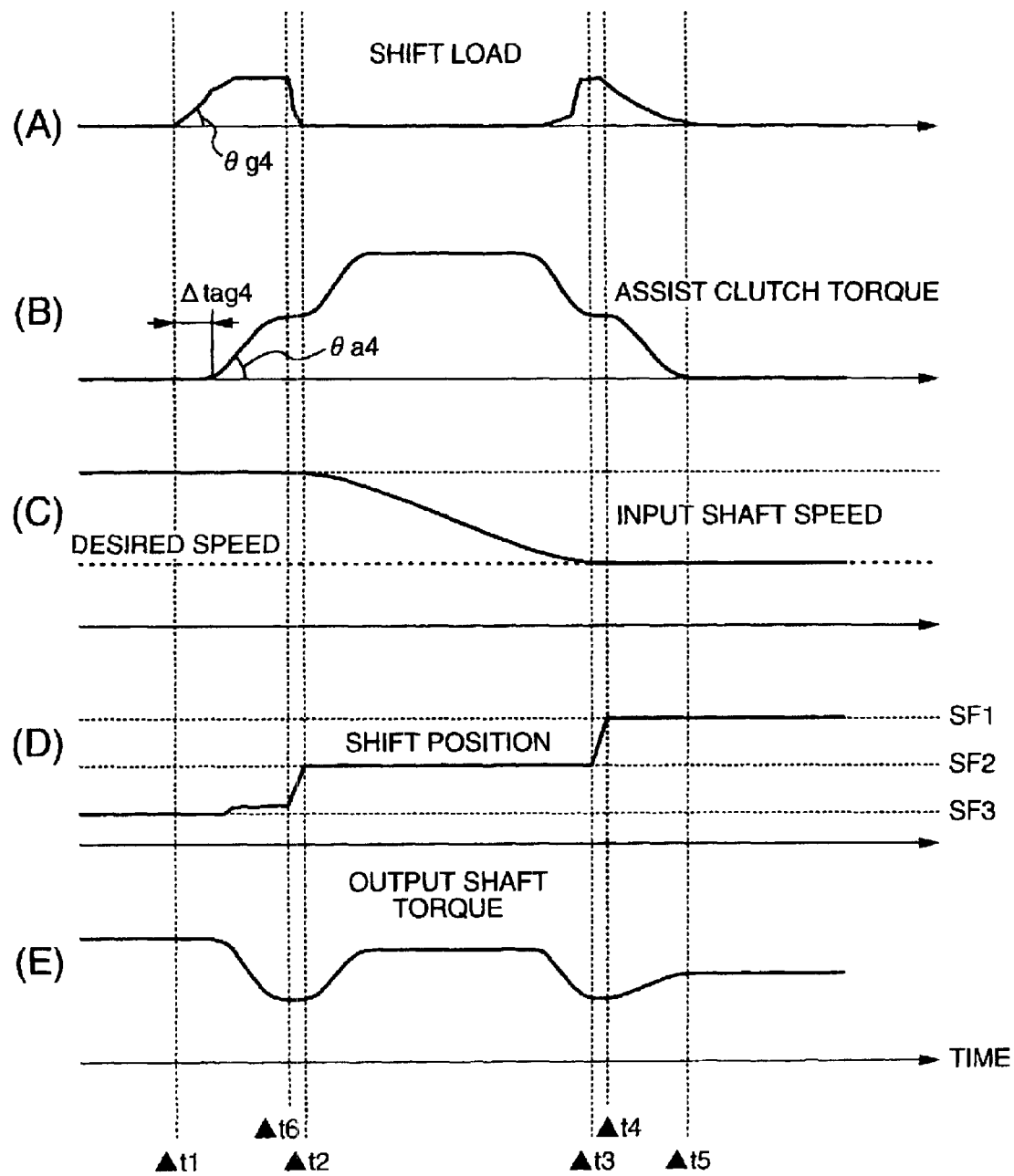
Figure 16:
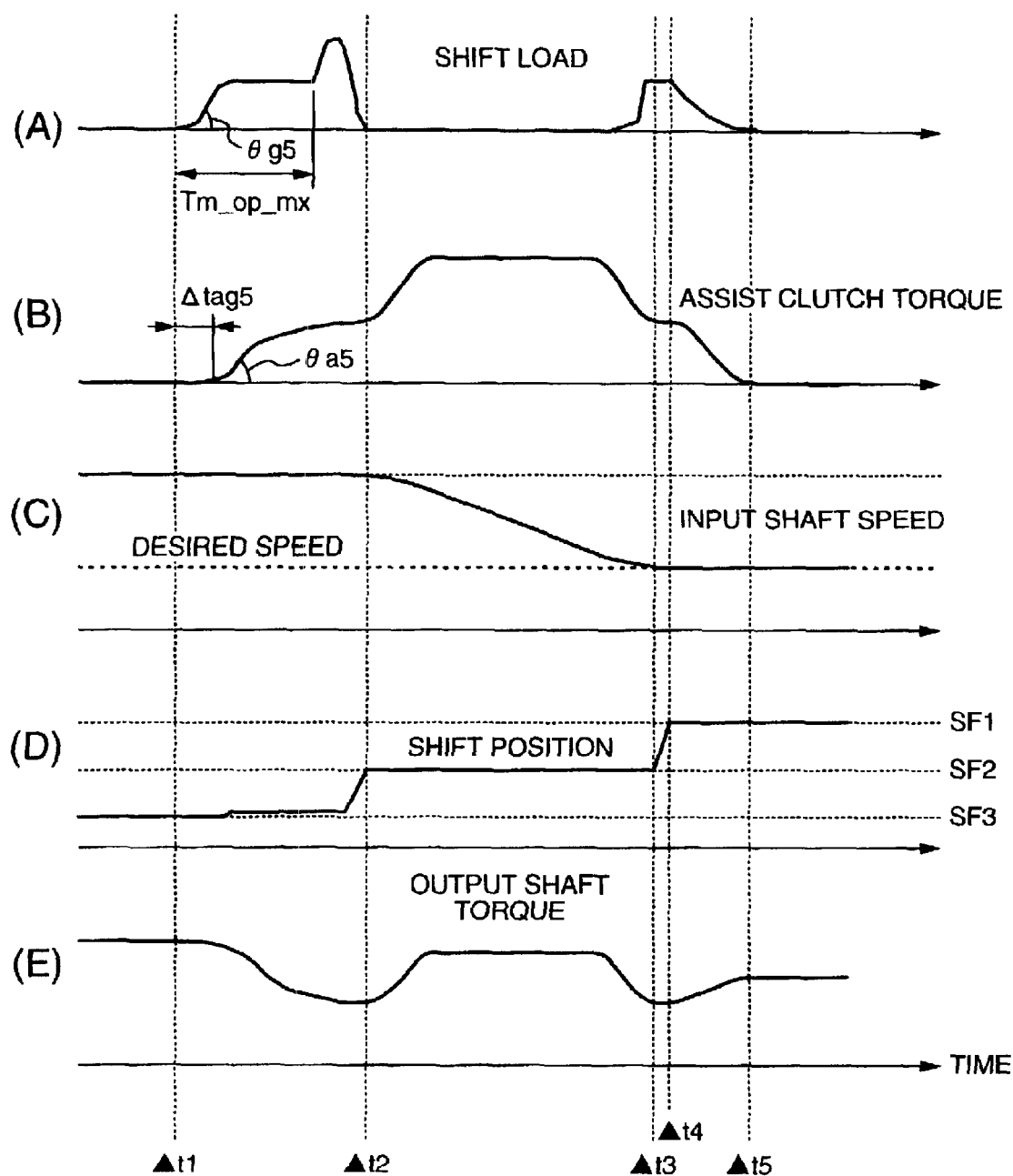
Figure 17:
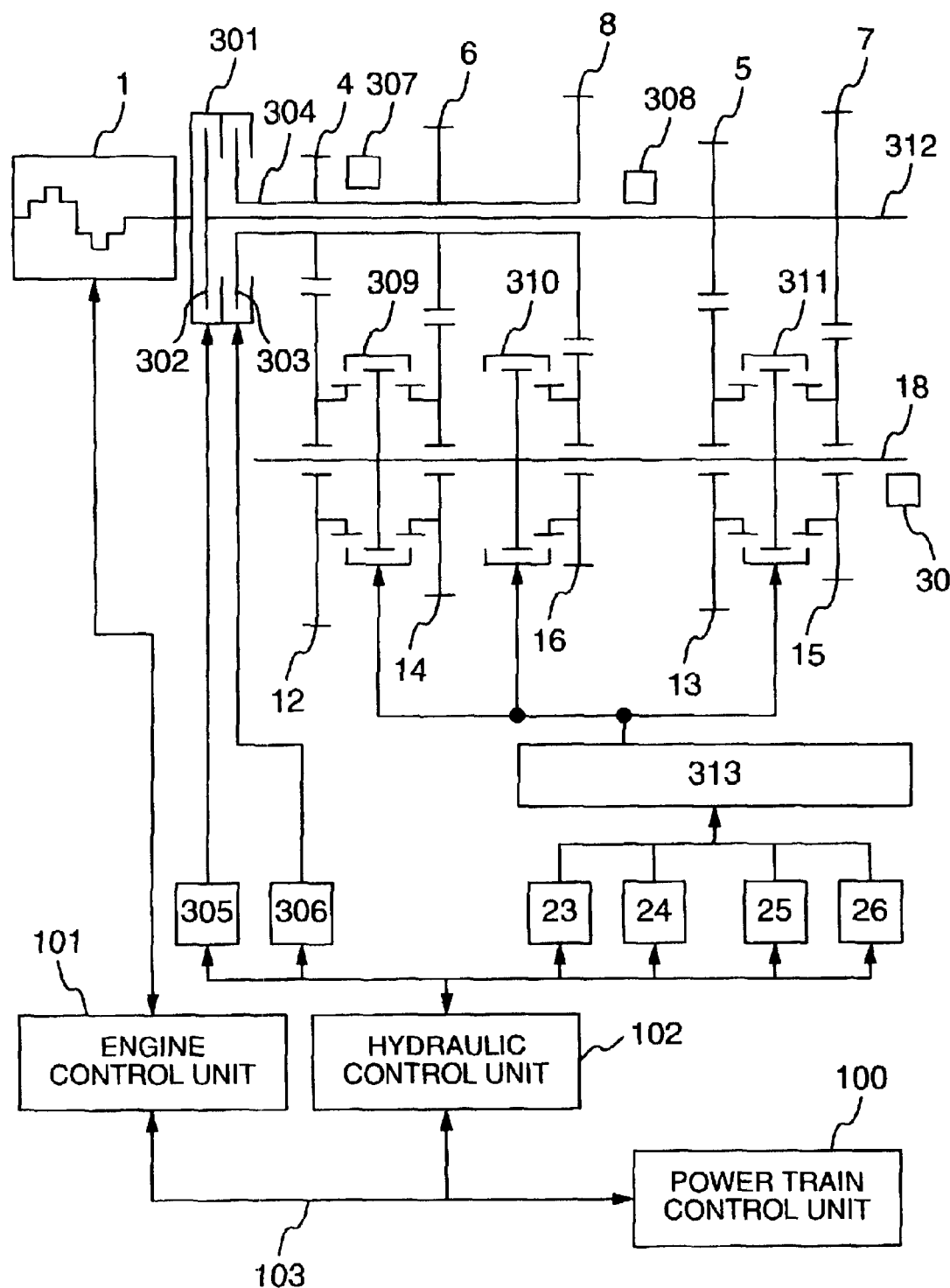
Figure 18:
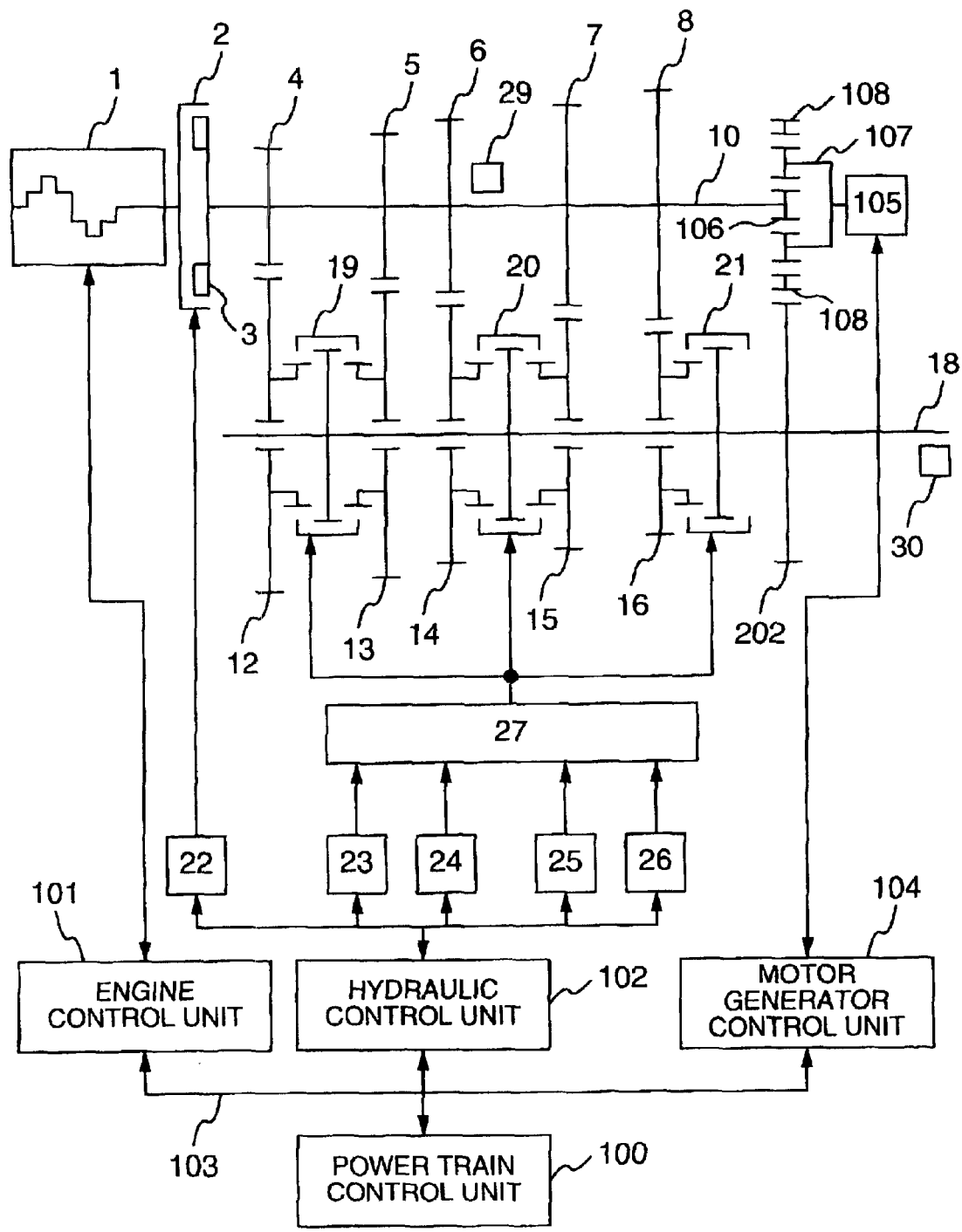

FIG. 4 is a view for explaining an input and output signal relationship by a communication means 103 among a power train control unit 100, an engine control unit 101 and a hydraulic control unit 102;

FIG. 5 is a flowchart exhibiting a control content of gear change control by an automobile control apparatus in an embodiment of the present invention;

FIG. 6 is a flowchart exhibiting the content of a timer indicating an elapse time of a control content of the gear change control by an automobile control apparatus in an embodiment of the present invention;

FIG. 7 is a flowchart exhibiting an entire control content of a release control phase of gear change control by the automobile control apparatus in an embodiment of the present invention;

FIG. 8 is a flowchart exhibiting a control content of a shift control process in a release control phase of speed change control by an automobile control apparatus in an embodiment of the present invention;

FIG. 9A is a view for explaining a functional structure for calculating a maximum release time Tm_op_mx used in a shift control process during a release control phase under gear change control by an automobile control apparatus in an embodiment of the present invention;

FIG. 9B is a view for explaining a functional structure for calculating a desired shift load in a certain condition used in a shift control process during release control under gear change by an automobile control apparatus in an embodiment of the present invention;

FIG. 9C is a view for explaining a functional structure for calculating a desired shift load in another condition used in a shift control process during release control under gear change by an automobile control apparatus in an embodiment of the present invention;

FIG. 10 is a flowchart exhibiting a control content of an assist clutch control process during a release control phase under gear change by an automobile control apparatus in an embodiment of the present invention;

FIG. 11 is a view for explaining a functional structure for calculating a desired torque Ktrq used in an assist clutch control process during a release control phase under gear change by an automobile control apparatus in an embodiment of the present invention;

FIG. 12 is a time-chart exhibiting a control content of gear change control by an automobile control apparatus in an embodiment of the present invention;

FIG. 13 is a time-chart exhibiting a control content of gear change control by an automobile control apparatus in an embodiment of the present invention;

FIG. 14 is a time-chart exhibiting a control content of gear change control by an automobile control apparatus in an embodiment of the present invention;

FIG. 15 is a time-chart exhibiting a control content of gear change control by an automobile control apparatus in an embodiment of the present invention;

FIG. 16 is a time-chart exhibiting a control content of gear change control by an automobile control apparatus in an embodiment of the present invention;

FIG. 17 is a skeleton view illustrating a configuration of a third system exhibiting an example of an automobile control apparatus in an embodiment of the present invention, and FIG. 18 is a skeleton view illustrating a configuration of a fourth system in an example of an automobile control apparatus in an embodiment of the present invention.

DETAILED DESCRIPTION OF THE PREFERRED EMBODIMENTS

Explanation will be hereinbelow made of a configuration and an operation of automobile control apparatus in an embodiment of the present invention with reference to FIGS. 1 to 18.

At first, referring to FIG. 1 which is a skeleton view illustrating a configuration of a first system of an automobile control apparatus in an embodiment of the present invention, a configuration of an automobile control apparatus in an embodiment of the present invention will be explained.

An engine control unit 101 receives a signal from an engine speed sensor (which is not shown) provided in an engine serving as a drive power source, for measuring a speed of an engine 1, and controls an electronic control throttle (which is not shown) for adjusting an engine torque, and a fuel injection device for injecting a quantity of fuel in accordance with an intake-air quantity in order to control an intake-air quantity, a fuel quantity, an ignition timing and the like, thereby it is possible to control a torque of the engine 1 with a high degree of accuracy. The fuel injection device may be of a cylinder injection type which directly injects fuel into a cylinder or an intake port injection type which injects fuel into an intake port, but is preferably of a type which can be reduce the fuel consumption in view of an operating range required for the engine (that is, a range determined in accordance with an engine torque and an engine speed), and an engine having such a type that an exhaust performance is satisfactory is advantageously used. Further, not only a gasoline engine but also a Diesel engine, a natural gas engine, a motor or the like may be used as a power source.

The engine 1 is coupled thereto with an input disc 2 in an input shaft clutch, and accordingly, when the input disc 2 is engaged with and disengaged from an output disc 3 in the input shaft clutch, a torque of the engine 1 can be transmitted to and cut off from to a transmission input shaft 10. The input shaft clutch is in general of a dry single disc type, but it may be of any of all frictional transmission types including a wet multiple disc type and a magnetic clutch. The input shaft 10 is fitted thereon with a first drive gear 4, a second drive gear 5, a third drive gear 6, a fourth drive gear 7, a fifth drive gear 8, a reverse gear (not shown) and a seventh drive gear 201. The pressing force (input shaft clutch torque) between the input disc 2 and the output disc 3 of the input shaft clutch is controlled by a hydraulic driven actuator 22, that is, the output power of the engine 1 can be transmitted to and cut off from the input shaft 10 by controlling the pressing force (input shaft clutch toque) of the actuator.

Further, the first drive gear 4, the second drive gear 5, the third drive gear 6, the fourth drive gear 7, a fifth drive gear 8 and the reverse gear are secured to the transmission input shaft 10, but the reverse gear (not shown) is rotatably journalled to the transmission input shaft 10. Further, a sensor 29 for detecting a rotational speed of the transmission input shaft 10 is provided to serve as an input shaft speed detecting means.

Meanwhile, a first driven gear 12, a second driven gear 13, a third driven gear 14, a fourth driven gear 15 and a fifth driven gear 16, and a reverse driven gear (not shown) are rotatably journalled to a transmission output shaft 18, but a seventh driven gear 202 is secured to the transmission output shaft 18. The first driven gear 12 is meshed with the first drive gear 4, the second driven gear 13 with the second drive gear 5, the third driven gear 14 with the third drive gear 6, the fourth driven gear 15 with the fourth drive gear 7, and the fifth driven gear 16 with the fifth drive gear 8, and the reverse driven gear (not shown) is engaged with the reverse drive gear through the intermediary of a reversing gear (not shown) while the seventh driven gear 202 is meshed with the seventh drive gear 201.

Further, between the first driven gear 12 and the second driven gear 13, there is provided a first meshing clutch 19 serving as a meshing transmission means for engaging the first driven gear 12 with the transmission output shaft 18 or engaging the second driven gear 13 with the transmission output shaft 18. Thus, a rotating torque transmitted from the first drive gear 4 or the second drive gear 5 to the first driven gear 12 or the second driven gear 13 is then transmitted to the first meshing clutch 19 through which it is transmitted to the transmission output shaft 18.

Further, between the third driven gear 14 and the fifth driven gear 15, there is provided a second meshing clutch 20 serving as a meshing transmission means for engaging the third driven gear 14 with the transmission output shaft 18 or engaging the fourth driven gear 15 with the transmission output shaft 18. Thus, a rotating torque transmitted from the third drive gear 6 or the fourth drive gear 7 to the third driven gear 14 or the fourth driven gear 15 is transmitted to the second meshing clutch 20 through which it is transmitted to the transmission output shaft 18.

Further, between the fifth driven gear 16 and the reverse driven gear (which is not shown), there is provided a third meshing clutch 21 serving as a meshing transmission means for engaging the fifth driven gear 16 with the transmission output shaft 18 or engaging the reverse driven gear with the transmission output shaft 18. Thus, a rotating torque transmitted from the fifth drive gear 8 or the reverse drive gear to the fifth driven gear 16 or the revere driven gear is transmitted to the third meshing clutch 21 through which it is transmitted to the transmission output shaft 18. Each of the meshing clutches is preferably incorporated therein with a synchronizer mechanism for smoothly adjusting rotational speeds to each other through a friction force.

With this arrangement, when any one of the first meshing clutch 19, the second meshing clutch 20 and the third meshing clutch 21 is shifted axially of the transmission output shaft 18 so as to fasten any one of the first driven gear 12, the second driven gear 13, the third driven gear 14, the fourth driven gear 15, the fifth driven gear 16 or the reverse driven gear, the rotating torque of the transmission input shaft 10 is transmitted to the first meshing clutch 19, the second meshing clutch 20 or the third meshing clutch 21. In order to fasten any one of the first driven gear 12, the second driven gear 13, the third driven gear 14, the fourth driven gear 15 and the fifth driven gear 16 or the reverse driven gear to the transmission output shaft 18, any one of the first meshing clutch 19, the second meshing clutch 20 and the third meshing clutch 21 is shifted, and further, in order to shift the any one of the first meshing clutch 19, the second meshing clutch 20 and the third meshing clutch 21, a shift/select mechanism 27 is actuated by a shift first actuator 23, a shift second actuator 24, a select first actuator 25 or a select second actuator 26. That is, by fastening any one of the first meshing clutch 19, the second meshing clutch 20 and the third meshing clutch 21 to any one of the first driven gear 12, the second driven gear 13, the third driven gear 14, the fourth driven gear 15, the fifth driven gear 16 or the reverse driven gear, the rotating torque of the transmission input shaft 10 can be transmitted to the transmission output shaft 18 through the intermediary of any one of the first meshing clutch 19, the second meshing clutch 20 and the third meshing clutch 21.

A sensor 30 for detecting a rotational speed of the transmission output shaft 18 is provided as an output shaft speed detecting means. Any one of the shift first actuator 23, the shift second actuator 24, the select first actuator 25, the select second actuator 26 may be constituted by an electromagnetic valve, an electric motor or the like. Further, the shift/select mechanism 27 may be constituted by a shifter rail, a shifter fork, a drum type one or the like. Further, the shift/select mechanism 27 is provided with a position holding mechanism (which is not shown) for holding a gear position in order to prevent gear from jumping out. The operation as to the shift first actuator 23, the shift second actuator 24, the select first actuator 25, the select second actuator 26, and the operational relationship among the first meshing clutch 19, the second meshing clutch 20 and the third meshing clutch 21 will be detailed later with reference to FIGS. 3a and 3b.

Further, an assist clutch including input and output clutch discs 203, 204 which is one kind of transmission torque changing means is incorporated, that is, the input disc 203 of the assist clutch is coupled to the seventh drive gear 201 while the output disc 204 is coupled to the transmission input shaft 10, and when the input disc 203 and the output disc 204 of the assist clutch are engaged with each other, the torque of the seventh drive gear 201 can be transmitted to the transmission output shaft 18 through the intermediary of the seventh driven gear 202.

The pressing force (assist clutch torque) between the input disc 203 and the output disc 204 of the assist clutch is controlled by a hydraulically driven actuator 205, and by adjusting the pressing force (assist clutch torque), the output power of the engine 1 can be transmitted or cut off.

The transmission torque changing means may be constituted by a frictional transmission means, a motor generator or the like. The frictional transmission means produces an inter-surface frictional force so as to transmit a torque, and is represented by a frictional clutch. The friction clutch may be of a dry single disc type, a dry multiple disc type, a wet multiple disc type, an electromagnetic clutch or the like. In this embodiment, a wet multiple disc type clutch is used as the frictional transmission means including the clutch discs 203, 204, but any of the other all transmission torque changing means may be used.

The rotating toque transmitted from the first drive gear 4, the second drive gear 5, the third drive gear 6, the fourth drive gear 7, the fifth drive gear 8, the reverse drive gear, the seventh drive gear 201 to the transmission output shaft 18 through the intermediary of the first driven gear 13, the third driven gear 14, the fourth driven gear 15, the fifth driven gear 16, the reverse driven gear and the seventh driven gear 202, is transmitted to an axle (which is not shown) through the intermediary of differential gears (which are not shown) coupled to the transmission output shaft 18.

The input shaft clutch actuator 22 for producing the pressing force (input shaft clutch torque) between the input disc 2 and the output disc 3 of the input shaft clutch, and an assist clutch actuator 205 for producing the pressing force between the input disc 203 and the output disc 204 of the assist clutch are controlled by a hydraulic control unit 102, that is, a current running through a solenoid valve (which is not shown) provided in each of the actuators is controlled so as to adjust a stroke distance of a hydraulic cylinder (which is not shown) provided in the associated actuator in order to control a hydraulic pressure of the associated actuator. Thereby the transmission torque of each of the clutches is controlled.

Further, currents running through solenoid valves (which are not shown) provided respectively in the select first actuator 25 and the select second actuator 26 are controlled by the hydraulic control unit 102 so as to adjust the stroke distances of hydraulic cylinders (which are not shown) provided respectively in the actuators in order to control the hydraulic pressures of the actuators, and accordingly, one of the first meshing clutch 19, the second meshing clutch 20 and the third meshing clutch 21 is selected for shifting.

Further, currents running through solenoid valves (which are not shown) provided respectively in the shift first actuator 23 and the shift second actuator 24 are controlled by the hydraulic control unit 102 so as to adjust the stroke distances of hydraulic cylinders (which are not shown) provided respectively in the actuators in order to control the hydraulic pressures of the actuators, and accordingly, loads for actuating the first meshing clutch 19, the second meshing clutch 20 and the third meshing clutch 21 can be controlled.

In this embodiment, although hydraulic actuators are used for the shift first actuator 23, the shift second actuator 24, the select first actuator 25 and the select second actuator 26 which can drive the shift/select mechanism 27, electric actuators constituted by electric motors may be also used therefor. Further, a single actuator may be used instead of both shift first actuator 23 and shift second actuator 24, and also a single actuator may be used instead of both select first actuator 25 and select second actuator. Further, although a shifter rail, a shifter fork or the like is used as a mechanism for actuating the first meshing clutch 19, the second meshing clutch 20 and the third meshing clutch 21, any means which can shift the meshing clutches 19, 20, 21, such as a drum type mechanism may also be used.

Further, in this embodiment, although hydraulic actuators are used as the input shaft clutch actuator 22 and the assist clutch actuator 205, electric actuators constituted by motors or the like may be used therefor.

Further, an intake air quantity, a fuel quantity, an ignition timing and the like are controlled by the engine control unit 101 provided in the engine 1 in order to precisely control the torque of the engine 1.

Further, the hydraulic control unit 102 and the engine control unit 101 are controlled by a power train control unit 100. Data are transmitted among the hydraulic control unit 102, the engine control unit 101 and the power train control unit 100 by way of a communication means 103.

In this embodiment, since the hydraulic actuators are used, the hydraulic control unit 102 is used inevitably for controlling the hydraulic actuators. However, in the case of using electric actuators constituted by electric motors, the motor control unit is used instead of the hydraulic control unit 102.

Next, referring to FIG. 2 which is a skeleton view illustrating a configuration of a second system in an automobile control apparatus in an embodiment of the present invention, and in which like reference numerals are used to denote like parts to those shown in FIG. 1, explanation will be made of a second configuration of the automobile control apparatus in this embodiment.

Figure 1:
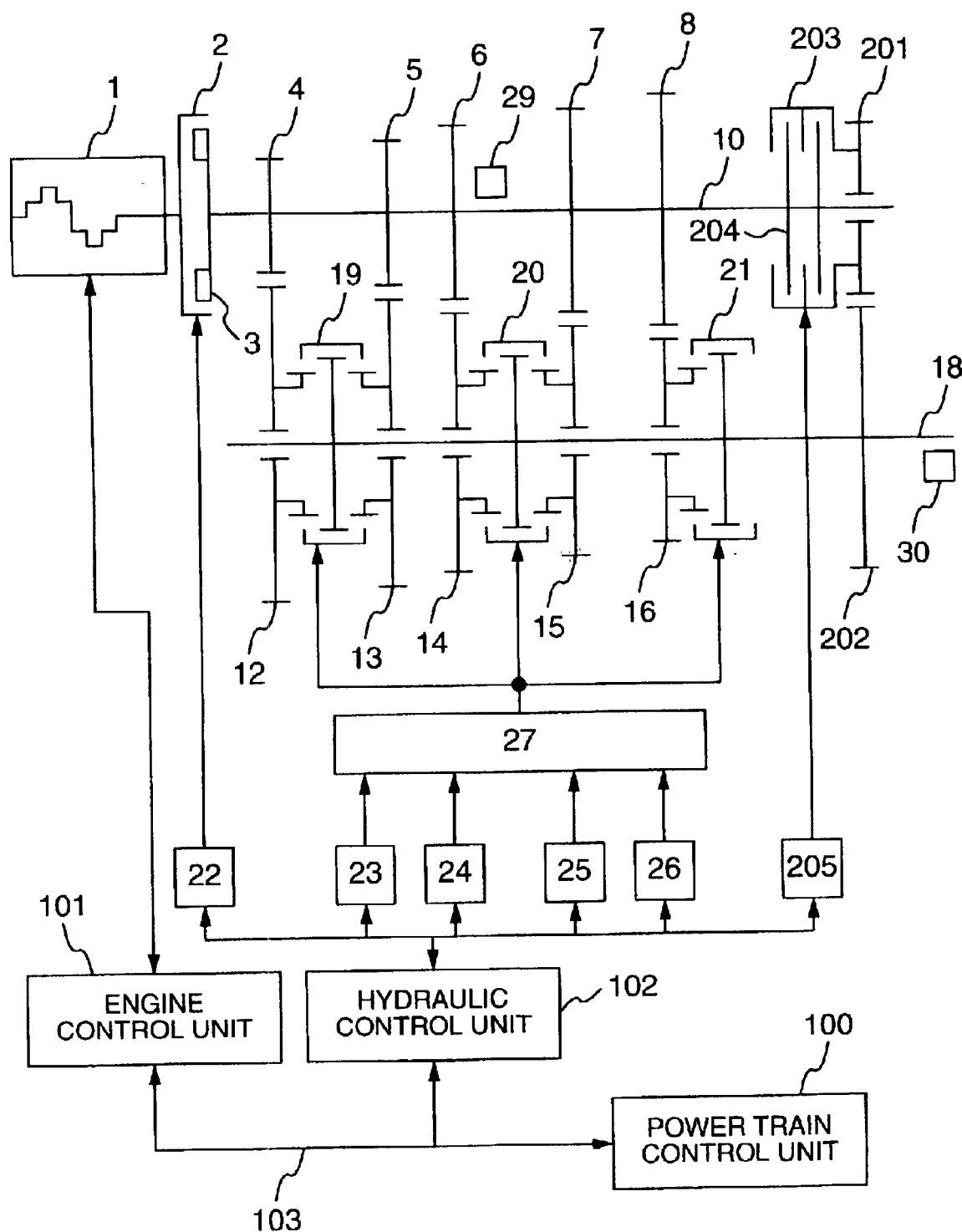
FIG. 1 is a skeleton view illustrating a configuration of a first system for an automobile control apparatus in an embodiment of the present invention.
Figure 2:
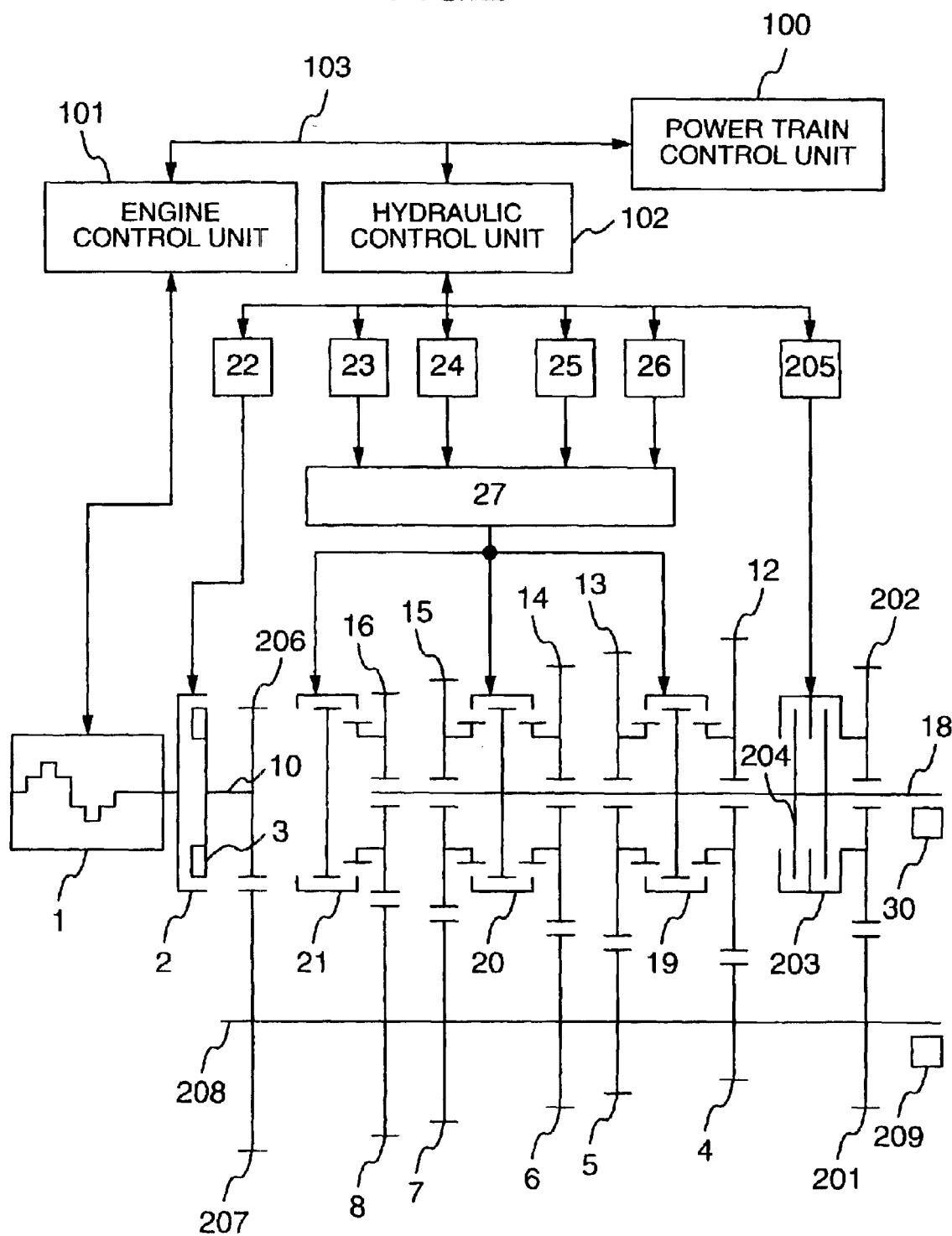
FIG. 2 is a skeleton view illustrating a configuration of a second system for automobile control apparatus in an embodiment of the present invention.

This configuration is the same as that shown in FIG. 1, except that three shafts including a counter shaft 208 are used in this embodiment which should be compared with the first embodiment in which two shaft, that is, the transmission input shaft 10 and the transmission output shaft 18 are used. That is, a power from the engine 1 is transmitted from an input drive gear 206 to an input driven gear 207, and is then transmitted to the transmission output shaft 18 from the counter shaft 208 by way of a first drive gear 4, a second drive gear 5, a third drive gear 6, a fourth drive gear 7, a fifth drive gear 8, a reverse drive gear (which is not shown) and a seventh drive gear 201, and by way of a first driven gear 12, a second driven gear 13, a third driven gear 14, a fourth driven gear 15, a fifth driven gear 16, a reverse driven gear (which is not shown) and seventh driven gear 202. Further, the seventh drive gear 201 and the seventh driven gear 202 coupled to the assist clutch may be constituted as a predetermined speed shift stage.

Thus, this embodiment may be applied to any of various transmissions each comprising a gear transmission incorporating a plurality of gear trains, and a plurality of torque transmission means between the input shaft and the output shaft of the transmission, at least one of the torque transmission means being a transmission torque changing means.

Next, referring to FIGS. 3A and 3B which are views for explaining the engaging relationship between clutches and driven gears in the automobile control apparatus in an embodiment of the present invention, explanation will be made of the engaging relationship between the clutches and the driven gears in the automobile control apparatus in this embodiment of the present invention.

FIG. 3A shows an engaging relationship among the first meshing clutch 19, the second meshing clutch 20, the third meshing clutch 21, the first driven gear 12, the second driven gear 13, the third driven gear 14, the fourth driven gear 15, fifth driven gear 16 and the reverse driven gear by controlling the shift/select mechanism 27, that is, the shift position and the select position with the use of the shift first actuator 23, the shift second actuator 24, the select first actuator 25 and the select second actuator 26.

Referring to FIG. 3A, the select first actuator 25 is pressurized but the select second actuator is depressurized so as to set the select position to a position SL1 in order to select the first meshing clutch 19 to be shifted, and the shift first actuator 23 is pressurized while the shift second actuator 24 is depressurized so as to set the shift position to a position SF1. Thus, the shift position and the select position are shifted to a point P1, and accordingly, as shown in FIG. 3B, the first meshing clutch 19 and the fist driven gear 12 are engaged to establish a first speed shift stage.

As shown in FIG. 3A, the select first actuator 25 is pressurized while the select second actuator 26 is depressurized so as to set the select position to the position SL1 in order to select the first meshing clutch 19 to be shifted, and the shift first actuator 23 is depressurized while the shift second actuator 24 is pressurized so as to control the shift load in order to control the shift position. Thus, the shift position is set to a position SF3, and accordingly, the shift position and the select position are shifted to a position P2. Thus, as shown in FIG. 3B, the first meshing clutch 19 and the second driven gear 13 are engaged with each other so as to establish a second speed shift stage.

Referring to FIG. 3A, the select first actuator 25, the select second actuator 26 are both pressurized so as to set the select position to a position SL2 in order to select the second meshing clutch 20 to be shifted, and the shift first actuator 23 is pressurized while the shift second actuator 24 is depressurized so as to control the shift load in order to control the shift position. Thus, the shift position is set to the position SF1, and accordingly, the shift position and the select position are shifted to a position P3. Thus, as shown in FIG. 3B, the second meshing clutch 20 is engaged with the third driven gear 14 so as to establish a third speed shift stage.

As shown in FIG. 3A, the select first actuator 25 and the select second actuator 26 are pressurized so as to set the select position to the position SL2 in order to select the second meshing clutch 20 to be shifted, and the shift first actuator 23 is depressurized while the shift second actuator 24 is pressurized so as to control the shift load in order to control the shift position. Thus, the shift position is set to a position SF3, and accordingly, the shift position and the select position are shifted to a point P4. As a result, as shown in FIG. 3B, the second meshing clutch 20 and the fourth driven gear 15 are engaged to each other so as to establish a fourth speed shift stage.

Referring to FIG. 3A, the select first actuator 25 is depressurized while the select second actuator 26 is pressurized so as to set the select position to a select position SL3 in order to select the third meshing clutch 21 to be shifted, and the shift first actuator 23 is pressurized while the shift second actuator 24 is depressurized so as to control the shift load in order to control the shift position for setting the shift position to the position SF1. Thus, the shift position and the select position are shifted to a position P5, and accordingly, as shown in FIG. 3B, the third meshing clutch 21 and the fifth driven gear 16 are engaged to each other so as to establish a fifth speed stage.

As shown in FIG. 3A, the select first actuator 25 is depressurized while the select second actuator 26 is pressurized so as to set the select position to the position SL3 in order to select the third meshing clutch 21 to be shifted, and the shift first actuator 23 is depressurized while the shift second actuator 24 is pressurized so as to control the shift load in order to control the shift position for setting the shift position to the position SF3. Thus, the shift position and the select position are shifted to a position PR, and accordingly, as shown in FIG. 3B, the third meshing clutch 21 and the reverse driven gear are engaged with each other so as to establish a reverse shift stage.

Referring to FIG. 3A, both shift first actuator 23 and shift second actuator 24 are pressurized so as to control the shift load in order to control the shift position for setting the shift position to the position SF2. Thus, the gear meshing is released to establish a neutral.

Next, referring to FIG. 4, explanation will be made of a relationship between input and output signals controlled by the communication means 103 among the power train control unit 100, the engine control unit 101 and the hydraulic control unit 102.

FIG. 4 is a view for explaining the relationship between the input and output signals controlled by the communication means among the power train control unit 100, the engine control unit 101 and the hydraulic control unit 102.

The power train control unit 100 is constituted by a control unit incorporating an input part 100i, an output part 100o and a computer unit 100c. Similarly, the engine control unit 101 is constituted by a control unit incorporating an input part 101i, an output part 101o and a computer 101c. The hydraulic control unit 102 is also constituted by a control unit incorporating an input part 102i, an output part 102o and a computer 102c.

An engine torque instruction value tTe is transmitted from the power train control unit 100 to the engine control unit 101 by way of the communication means 103, and accordingly, the engine control unit 101 controls an intake air quantity, a fuel quantity, an ignition timing and the like (which are not shown) in the engine 1 in response to the engine torque instruction value tTe. Further, the engine control unit 101 incorporates therein an engine torque detecting means (which is not shown) for detecting an input torque from the engine to the transmission and accordingly, the engine control unit 101 detects a speed Ne of the engine 1 and an engine torque Te produced by the engine 1, and delivers them to the engine power train control unit 100 by way of the communication means 103. As to the engine torque detecting means, there may be used not only a torque sensor but also an estimating means for estimating a torque from engine parameters such as a width of an injection pulse applied to an injector and a pressure in the intake pipe, and an engine speed.

The power train control unit 100 delivers an input shaft clutch desired torque TTqSTA, a desired shift load Fsft, a desired select position tpSEL and an assist clutch desired torque TTq to the hydraulic control unit 102. The hydraulic control unit 102 controls the input shaft clutch actuator 22 in response to the input shaft clutch desired torque TTqSTA so as to engage and disengage the input disc 2 and the output disc 3 of the input shaft. Further, it controls the shift first actuator 23, the shift second actuator 23, the select first actuator 25 and the select second actuator 26 in response to the desired shift load Fsft, and the desired select position tpSEL so as to actuate the shift/select mechanism 27 in order to control the shift position and the select position, resulting in the engagement and the disengagement of the first meshing clutch 19, the second meshing clutch 20 and the third meshing clutch 21. It also controls the assist clutch actuator 205 in response to the assist clutch desired torque TTq so as to engage and disengage the input disc 203 and the output disc 204 of the assist clutch.

Further, the hydraulic control unit 102 detects a position signal rpSTA, a shift position signal rpSFT and a select position signal rpSEL for engaging and disengaging the input shaft clutch, and delivers them to the power train control unit 100.

Further, the power train control unit 100 receives an input shaft speed Ni, the output shaft speed No respectively from the input shaft speed sensor 29 and the output shaft speed sensor 30, and also receives a range position signal RngPos indicating a shift lever position, that is, a P-range, R-range, N-range, D-range or the like, an acceleration depression degree Aps, an ON/OFF signal BR delivered from a brake switch and indicating whether the brake is depressed or not.

The power train control unit 100 determines that the driver will start and accelerate the vehicle when the driver sets the shift range to the D-range while he depresses the accelerator pedal, and further, determines that the driver will decelerates and stops the vehicle when he depresses the brake pedal, and sets an engine torque instruction value tTe, an input shaft toque TTqSTA, a desired shift load Fsft and the desire select position tpSEL in order to come up to the intention of the driver. Further, it sets a speed shift stage in accordance with a vehicle speed Vsp calculated from the output shaft speed No and an accelerator depression degree Aps, and sets an engine torque instruction value tTe, an input shaft clutch desired torque TTqSTA, a desired shift load Fsft, a desired select position tpSEL and assist clutch desired torque TTq in order to carry out shifting to the set speed shift stage. It is noted here that the hydraulic control unit 102 controls the shift first actuator 23 and the shift second actuator 24 in a direction in which the shift position is shifted toward the SF1 side as shown in FIG. 3A, if the desired shift load Fsft>0, but it controls the shift first actuator 23 and the shift second actuator 24 in a direction in which the shift position is shifted toward the SF3 side as shown in FIG. 3A if the desired shift load Fsft<0.

Next, explanation will be made of the control content of the gear change control by the automobile control apparatus in this embodiment with reference to FIGS. 5 to 11.

At first, referring to FIG. 5, explanation will be made of the control content of the entire gear change control by the automobile control apparatus in this embodiment.

FIG. 5 is a flow-chart which shows the control content of the speed change control by the automobile control apparatus in the embodiment of the present invention.

The content of the speed change control, as will be hereinbelow explained, has been programmed and stored in the computer 100c of the power train control unit 100, and is carried repeatedly with a predetermined period. That is, a process from following steps 501 to 509 is carried out by the power train control unit 100.

At step 501, the power train control unit 100 reads parameters, and at step 502, it determines whether a speed change is started or not. The determination whether the speed change is started or not is determined is carried out by setting a speed shift stage in accordance with a vehicle speed Vsp and an accelerator depression degree Aps among the read parameters, and the speed change is started if the set speed shift stage is different from the present speed shift stage, but is not started if the speed shift stage is the same as the present speed shift stage. If the speed change is started, step 503 is carried out, but if no speed change is carried out, the process is ended.

If the speed change operation is carried out, at step 503 (release control phase), release control is carried out in order to release the gears, which will be detailed later with reference to the drawings subsequent to FIG. 7.

Next, at step 504, whether the release control is completed or not is determined. The determination whether the release control is completed or not is made by determining whether the shift position rpSFT is located at a position with which it can be determined as the released position or not, that is, whether the shift position rpSFT is in a predetermined range around the shift position SF2 shown in FIG. 300 or not. If threshold values with which whether it is the release position or not is determined are denoted by SF1OFF, SF3OFF, the release position is given as SF1OFF≧rpSFT≧SF3OFF. It is noted that the threshold values are desirably set to values defining a range which is as wide as possible within a range where the meshing clutches are disengaged. If the determination at step 504 exhibits that the release control is completed, at step 505, but if it is not completed, the step 503 is again carried out.

When the release control is completed, at step 505 (rotational speed synchronizing control phase), an assist clutch torque is controlled so as to synchronize the input shaft speed with a speed corresponding to a next speed shift stage (a desired speed).

Further, at step 506, whether the speed synchronizing control is completed or not determined. A condition in which the speed synchronizing control is completed is such that a difference between the next speed shift stage speed (desired speed) and the input shaft speed becomes small (that is, |Input Speed Ni−Output Speed No×Desired Speed Gear Ratio □n| is small), and the select position is located at the desired position. The determination as to the select position is made by determining if for example, speed shift is made from the second speed shift stage to the third speed shift stage and whether the select position rpSEL shown in FIG. 3A is within the predetermined range around SL2 or not. It is preferably to provide a time delay in each of the condition as to the speed difference and the condition as to the select position.

If the determination at step 506 exhibits the completion of the synchronizing control, step 507 (fastening control phase) is carried out, but if the synchronizing control is not completed, step 505 is again carried out to continue the synchronizing control.

When the synchronizing control is completed, at step 507 (fastening control phase), fastening control is carried out in order to fasten gears.

Next, at step 508, whether the fastening control is completed or not is determined. It is noted that the condition of completion of the fastening control is such that the shift position is located at the desired position. The determination as to the shift position is made by determining whether the shift position rpSFT shown in FIG. 3 is within the predetermined range around SF1 or not.

After the completion of the fastening control, step 509 (speed shift ending phase), the assist clutch desired torque TTq is set to 0, and thereafter, the speed change control is ended. If the fastening control is not completed, step 507 is carried out again in order to continue the fastening control.

Next, referring to FIG. 6, explanation will be made of the content of the timer exhibiting an elapsed time of the control content of the speed change control by the automobile control apparatus in the embodiment of the present invention is carried out.

FIG. 6 is a flow-chart which indicates an elapsed time of the control content of the speed change control of the automobile control apparatus in the embodiment of the present invention.

The content which will be explained herebelow has been previously programmed and stored in the computer 100c of the power train control unit 100, and is repeated with a predetermined period. That is, a process from step 601 to 608, is carried out by the power train control unit 100.

At step 601, the power train control unit 100 determines whether it is on a speed change or not, and if it is on a speed change, step 602 is carried out, but it is not on a speed change, at step 608, a release control phase timer Tm-op, the sped synchronizing control phase timer Tm-ns, the phase control timer Tm-cn are respectively reset.

At step 602, whether it is on the release control phase or not is determined. If it is on the release control phase, at step 605, the release control phase timer Tm-op is counted up. If it is not on the release control phase, step 603 is carried out.

At step 603, whether it is on the speed synchronizing phase or not is determined. If it is on the speed synchronizing phase, at step 606, the speed synchronizing control phase timer Tm-ns is counted up. If it is not on the speed synchronizing control phase, step 604 is carried out.

At step 604, whether it is on the fastening control phase or not is determined, and if it is on the fastening control phase, at step 607, the fastening control phase timer Tm-cn is counted up. If it is not on the fastening control phase, nothing is carried out.

Next, explanation will be made of the control content of the speed change control, at step 503 (release control phase), by the automobile control apparatus in the embodiment of the present invention with reference to FIGS. 7 to 11.

Referring at first to FIG. 7, explanation will be made of the general control content of the release control phase of the speed change control by the automobile control apparatus in this embodiment.

FIG. 7 is a flow-chart which shows the general control content of the release control phase of the speed change control by the automobile control apparatus in the embodiment of the present invention.

The release control phase exhibited at step 503 shown in FIG. 5, consists of step 701 (a shift control process) and step 702 (an assist clutch control process). Step 701 (the shift control process) will be detailed later with reference to FIG. 8, and step 702 (the assist clutch control process) will be detailed later with reference to FIG. 10.

Next, referring to FIG. 8 and FIGS. 9A to 9C, detailed explanation will be made of the control content of step 701 (shift control process) shown in FIG. 7.

FIG. 8 shows a flow-chart exhibiting the content of the shift control process in the release control phase of the speed change control by the automobile control apparatus in the embodiment of the present invention. FIGS. 9A to 9C are views for explaining functional structures with which a release maximum time Tm-op-mx and a desired shift load Fsft which are used in the shift control process in the release control phase of the speed change control by the automobile control apparatus in the embodiment of the present invention.

At step 801 in FIG. 8, the power train control unit 100 reads parameters, and at step 802, it determines whether the release control phase has been just started or not. If the release control timer phase Tm-op=0, at step 803, a release maximum time Tm-op-mx is set, and then step 804 is carried out. The release maximum time Tm-op-mx is considered to be a function of an input torque Tq-in as shown in FIG. 9A. A function f1 for calculating the release maximum time Tm-op-mx carries out calculation from an input toque Tq-in. It is preferably set differently for speed shift stages to be released, respectively.

If the release control phase time Tm-op≠0, step 804 is carried out.

Next, at step 804, a time determination is carried out. If the release control phase timer Tm-op<the release maximum time Tm-op-mx, step 805 (a shift load control process 1) is carried out. The desired shift load Fsft at step 805 is consider to be a function of the release control phase timer Tm-op. A function g1 for calculating the desired shift load Fsft carries out calculation from an input obtained from the release control phase timer Tm-op as shown in FIG. 9B.

If the Release Control Phase Timer Tm-op≧Release Maximum Time Tm-op-mx, step 806 (a shift load control process 2) is carried out. The desired shift load Fsft at step 806 is considered to be a function of a shift position rpSFT. T. A function g2 for calculating the desired shift load Fsft carries out calculation from an input delivered from a shift position rpSFT as an input as shown in FIG. 9C.

A resistance against movement of the meshing clutch is composed of frictional resistances of both meshing clutch and shift mechanism, a retention force of the position holding mechanism for holding the gear position in order to prevent jump-up of gears during running, resistances caused by a torque transmitted by gear trains (meshing clutch), and the like. A set value for the function g1 shown in FIG. 9B, is desired to be set to a value which is higher than the sum of frictional resistances of the meshing clutch and the shift mechanism, the retention force of the position holding mechanism for holding a gear position. Further, it is desirable to be set differently for speed shift stages to be released, respectively.

Next, referring to FIGS. 10 and 11, explanation will be made of a detailed control content of step 702 (the assist clutch control process) shown in FIG. 7.

FIG. 10 shows a flow-chart which exhibits the control content of the assist clutch control process in the release control phase of the speed change control by the automobile control apparatus in the embodiment of the present invention. FIG. 11 is a view for explaining a functional structure for calculating a desired torque gain Ktrq used in the assist clutch control process in the release control phase of the speed change control by the automobile control apparatus in the embodiment of the present invention.

At step 1001 shown in FIG. 10, the power train control unit 100 reads parameters, and set a desired release torque TTq-off at step 1002. The desired released torque TTq-off is obtained by multiplying an input torque Tq-in with a gain Kg. The input torque Tq-in is a torque inputted to the transmission, and is calculated from an engine torque Te. The gain kg is desirably set differently for speed shaft stages to be released, respectively.

Next, at step 1003, a desired torque gain Ktrq is set. The desired torque gain ktrq is considered to be a function of the release control timer Tm-op. The desired torque gain Ktrq is calculated from an input delivered from the release control phase timer Tm-op. Further, it is desired to be set differently for speed shift stages to be released, respectively. Moreover, it is desired to be set for each input torque Tq-in.

Next, at step 1004, an assist clutch desired torque TTq is calculated by multiplying the desired release torque TTq-off with the desired torque gain Ktrq. By gradually increasing the desired torque gain Ktrq from 0, the assist clutch torque TTa is gradually increased from 0.

The essential features of this embodiment is the provision of such a configuration that the shift load Fsft shown in FIG. 9B is applied to the meshing clutch by carrying out the shift load control process at step 805 in FIG. 8 during the release control of the meshing clutch.

Explanation will be hereinbelow made of a route through which a torque produced from the engine 1 is transmitted to the output shaft 18. There are two routes one of which transmits it through the discs 203, 204 in the assist clutch and the other one of which transmits it through the meshing clutches 19, 20, 21. Further, the following relationship among an input torque Ti to the input shaft 10 and an output torque T0 from the output shaft 18 and the output Ta transmitted by way of the clutch discs 203, 204 in the assist clutch is exhibited by:

$$To = \gamma A \cdot Ta + (Ti - Ta) \times \gamma 1 \tag{1}$$

where γA is a gear ratio between the seventh gears 201, 202 connected to the discs 203, 204 in the assist clutch, and γ1 is a gear ratio between the first gears 4, 12 for transmitting a torque through the intermediary of the meshing clutch 19.

As mentioned above, when the speed change is started, the assist clutch torque Ta (the assist clutch torque TTq as mentioned above) is gradually increased from 0, and a timing Ti=Ta is optimum for releasing the meshing clutch. If the releasing is made with this timing, no step-like change in torque is present.

Meanwhile, the total resisting force F against movement of the meshing clutch consists of a frictional resistance force F1 given by the meshing clutch and the shift mechanism, a retention force F2 of the position holding mechanism for holding a gear position in order to prevent occurrence of jump-out of gears during running, a resisting force F3 by a torque transmitted by gear trains (the meshing clutch) and the like. That is, F=F1+F2+F3. It is noted here that the resisting force F3 caused by a torque transmitted by the gear trains (the meshing clutch) is changed depending upon a torque transmitted by the gear trains (the meshing clutch), and becomes 0 with an optimum timing (Ti=Ta) for disengaging the meshing clutch. Accordingly, the total resisting force F becomes F1+F2 at this time.

In this embodiment, a load F4 which is greater than the resisting force F1+F2 given by the friction resistance and a resistance caused by the retention force is to be applied in a direction in which the meshing clutch is shifted toward the release position, before a torque transmitted by the meshing clutch is released. This load F4 is the shift load Fsft shown in FIG. 9B. By applying the load F4 (the shift load Fsft) which is greater than the resisting force F1+F2, a torque from the engine 1 is transmitted by the assist clutch, and accordingly, at the time when the torque transmitted by gear trains (the meshing clutch) becomes sufficiently small, the load F4 in a direction in which the meshing clutch is shifted toward the release position, becomes larger than the resistance F (=F1+F2) against the movement of the meshing clutch, and accordingly, the meshing clutch is shifted to the release position for releasing gears. Thus, even though unevenness and aging effect are present in the characteristics of the assist clutch serving as the transmission torque changing means, the input torque is transmitted by the assist clutch, and when the torque transmitted by the meshing clutch is released, the meshing clutch is shifted to the release position so as to release the gear, and accordingly, the drive function (speed change feeling) can be prevented from being lowered with no occurrence of a step-like change in torque due to the gear release.

In this embodiment, rise-up slopes and rise-up timings of the assist clutch TTq (the function h1 in FIG. 11) and the shift load Fsft (the function g1 in FIG. 9B) can be optionally set by the function h1 shown in FIG. 11, for calculating the desired toque gain Ktrq and the function g1 shown in FIG. 9B, for calculating the shift load Fsft.

It is noted here that in this embodiment, the rise-up slopes of the assist clutch torque TTq and the shift load Fsft are set so that the rise-up slope θa of the assist torque TTq (the function h1 shown in FIG. 11) is not less than the rise-up slope θg of the shift load Fsft (the function g1 shown in FIG. 9B) (θa ≧ θg).

As to the rise-up timings for the assist clutch toque TTq and the shift load Fsft, if the rise-up timing ta of the assist clutch torque TTq (the function h1 in FIG. 11) may be set to a value which is earlier, equal to or later the rise-up timing of the shift load Fsft (the function g1 in FIG. 9B). If the case of setting the rise-up timing of the assist clutch torque TTq (the function h1 in FIG. 11) to be later than the rise-up timing of the shift load Fsft (the function g1 in FIG. 9B), the rise-up slope θa of the assist clutch torque TTq (the function h1 in FIG. 11) is set to be greater than the shift load Fsft (the function g1 in FIG. 9B) (θa>θg).

Next, explanation will be made of the control content in the case of changing the rise-up slopes and the rise-up timings of the assist clutch torque TTq (the function h1 in FIG. 11) and the shift load Fsft (the function g1 in FIG. 9B) will be explained with reference to FIGS. 12 to 15.

FIGS. 12 to 15 show time-charts which exhibit the control content of the speed change control by the automobile control apparatus in the embodiment of the present invention.

FIG. 12 shows a time-chart for control upon an up-shift from the first speed shift stage to the second speed shift stage when the function g1 in FIG. 9B for calculating the shift load Fsft and the function H1 in FIG. 11 for calculating the desired torque gain Ktrq for setting a rise-up of the assist clutch TTq with which the rise-up of the assist clutch torque TTq is set, are set, in order to apply a shift load before the assist clutch torque rises up. That is, the rise-up timing of the function g1 in FIG. 9B is set to be early than that of the function h1 in FIG. 11 while the rise-up slope of the function g1 in FIG. 9B is set to be equal to that of the function h1 in FIG. 11.

Referring to FIG. 12, the release control phase is given by a period from a time t1 to a time t2, the speed synchronizing control phase by a period from a time t2 to a time t3, the fastening control phase by a period from a time t3 to a time t4, and the speed change ending phase by a period from a time t4 to a time t5. Further, (A) gives the shift load, (B) the assist clutch torque, (C) the input shaft speed and the output shaft speed, (D) the shift position and (E) the output shaft torque.

In the release control phase (the time t1 to the time t2), as shown in (A) in FIG. 12, the shift load rises up at the time t1, and with a slight lag (Δtag1), the assist clutch torque rises up as shown in FIG. (B). It is noted that the shift load shown in (A) is set to be positive in a direction in which the shift position shown in (D) is shifted toward the SF1 side, and accordingly, it is in a negative direction. Further, the rise-up slope (θg1 in (A)) of the function g1 in FIG. 9B is set to be equal to that (θa1 in (B)) of the function h1 in FIG. 11.

By applying the shift load shown in (A) in FIG. 12, the shift position is slightly shifted from the position SF1 toward the position SF". This shift is caused by a play in the gear position holding mechanism or the like.

At the time when the assist clutch torque rises up sufficiently so that a substantial part of a torque transmitted by the first drive gear 4, the first driven gear 12 and the first meshing clutch 19 is released (that is, a time t6: at this time, the assist clutch torque Ta becomes substantially equal to the input torque Ti), the shift load shown in (A) becomes greater than the total resisting force F against the movement of the meshing clutch, and accordingly, the shift position is shifted from the position SF1 to the position SF2. During a period (time t6 to time t2) in which the shift position is shift as shown in (D), no step-like change in torque is present on the output shaft torque of the transmission as shown in (E). Thus, the gear release is smoothly carried out with no shock.

The shift position is shifted to the shift position SF2, if it can be determined that the shift position rpSFT is at the release position, that is, it is in the range of SF1OFF≧rpSFT≧SF3OFF, where SF1OFF and SF3OFF are threshold values for determining the release position, and accordingly, the shift load shown in (A) is reduced to 0.

When the shift position shown in (D) in FIG. 12 comes around the position SF2 (at the time t2), the speed synchronizing control phase is effected. In the speed synchronizing control phase, the input speed is synchronized with a desired speed corresponding to a next speed shift stage as shown in (c) by the assist clutch torque shown in (B).

At the time when the speed is synchronized (at time t3), the shift position shown in (D) in FIG. 12 is shifted from the position SF2 to the position SF3. At the time t4 at which the shift position shown in (D) is shifted to the position SF3, the speed change ending phase is effected, and accordingly, as shown in (B), the assist clutch becomes 0. Thus, the speed change control is ended.

Next, FIG. 13 shows a time chart for control upon up-shift from the first speed shift stage to the second speed shift stage upon which the function g1 in FIG. 9B for calculating the shift load Fsft and the function H1 in FIG. 11 for calculating the desire torque gain Ktrq for setting a rise-up of the assist clutch torque TTq are set, in order to apply the shift load, simultaneously with the rise-up of the assist clutch torque. That is, the rise-up timing of the function h1 in FIG. 11 and the rise-up timing of the function g1 in FIG. 9B are set to the same time, and further, the rise-up slope of the function g1 in FIG. 9B is set to be greater than that of the function h1 in FIG. 11.

Similar to FIG. 12, the release control phase is given by a period from a time t1 to a time t2, the speed synchronizing control phase by a period from a time t2 to a time t3, the fastening control phase by a period from a time t3 to a time t4, and the speed change ending phase by a period from a time t4 to a time t5. Further, (A) in FIG. 13 gives the shift load, (B) the assist clutch torque, (C) the input shaft speed and the output shaft speed, (D) the shift position and (E) the output shaft torque.

In the release control phase, at the time t1, the shift load shown in (A) in FIG. 13 and the assist clutch torque shown in (B) rise up simultaneously. The rise-up slope (a slope θg2 in (A) in FIG. 13) of the function g1 in FIG. 9b is set to be greater than the rise-up slope (a slope θa2 in (B) in FIG. 13) of the function h1 in FIG. 1.

The shift position shown in (D) in FIG. 13 is slightly shifted from the position SF1 to the position SF3 by the shift load shown in (A). At the time when the assist clutch torque sufficiently rises up so that a substantial part of the torque transmitted by the meshing clutch is released (time t6), the shift position is shifted from the position SF1 to the position SF2, as shown in (D), by the shift load shown in (A). During the period in which the shift position is shifted (time t6 to t2), no step-like change as shown in (E) is caused in the output shaft torque of the transmission, and accordingly, the gear release can be smoothly made with no shock.

As shown in (D) in FIG. 13, when the shift position comes to a position around the position SF2 (time t2), the speed synchronizing control phase is effected. In the speed synchronizing control phase, the input speed is synchronized with a speed corresponding to the next speed shift stage, as shown in (C) in FIG. 13, by the assist clutch torque shown in (B). At the time when the speed is synchronized (time t3), the shift position shown in (D) is shifted from the position SF2 to the position SF3. At the time t4 when the shift position is shifted to the position SF3, the speed change ending phase is effected, and accordingly, the assist clutch torque becomes zero as shown in (B). Thus, the speed change is ended.

Next, FIG. 14 shows a time chart for control upon up-shift from the first speed shift stage to the second speed shift stage upon which the function g1 in FIG. 9B for calculating the shift load Fsft and the function H1 in FIG. 11 for calculating the desire torque gain Ktrq for setting a rise-up of the assist clutch torque TTq are set, in order to apply the shift load with a slight lag from the rise-up of the assist clutch torque. That is, the rise-up timing of the function g1 in FIG. 9B is set to be slightly later than the rise-up timing of the function h1 in FIG. 11, and further, the rise-up slope of the function g1 in FIG. 9B is set to be greater than that of the function h1 in FIG. 11.

Similar to FIG. 12, the release control phase is given by a period from a time t1 to a time t2, the speed synchronizing control phase by a period from a time t2 to a time t3, the fastening control phase by a period from a time t3 to a time t4, and the speed change ending phase by a period from a time t4 to a time t5. Further, (A) in FIG. 13 gives the shift load, (B) the assist clutch torque, (C) the input shaft speed and the output shaft speed, (D) the shift position and (E) the output shaft torque.

In the release control phase, at the time t1, the assist clutch torque shown in (B) in FIG. 14 starts its rise-up, and then, with a slight lag $\Delta$tag3, the shift load shown in (A) rises up. The rise-up slope (a slope $\theta$g3 in (A) in FIG. 14) of the function g1 in FIG. 9b is set to be greater than the rise-up slope (a slope $\theta$a3 in (B) in FIG. 14) of the function h1 in FIG. 11.

The shift position shown in (D) in FIG. 14 is slightly shifted from the position SF1 to the position SF2 by the shift load shown in (A). At the time when the assist clutch torque sufficiently rises up so that a substantial part of the torque transmitted by the meshing clutch is released (time t6) as shown in (B), the shift position is shifted from the position SF1 to the position SF2, as shown in (D), by the shift load. During the period in which the shift position is shifted (time t6 to t2), no step-like change as shown in (E) is caused in the output shaft torque of the transmission, and accordingly, the gear release can be smoothly made with no shock.

As shown in (D) in FIG. 14, when the shift position comes to a position around the position SF2 (time t2), the speed synchronizing control phase is effected. In the speed synchronizing control phase, the input speed is synchronized with a speed corresponding to the next speed shift stage, as shown in (C) in FIG. 14, by the assist clutch torque shown in (B). At the time when the speed is synchronized (time t3), the shift position shown in (D) is shifted from the position SF2 to the position SF3. At the time t4 when the shift position is shifted to the position SF3, the speed change ending phase is effected, and accordingly, the assist clutch torque becomes zero as shown in (B). Thus, the speed change is ended.

Next, FIG. 15 shows a time chart for control upon up-shift from the second speed shift stage to the third speed shift stage upon which the function g1 in FIG. 9B for calculating the shift load Fsft and the function H1 in FIG. 11 for calculating the desire torque gain Ktrq for setting a rise-up of the assist clutch torque TTq are set, in order to apply the shift load before the assist clutch torque rises up.

Similar to FIG. 12, the release control phase is given by a period from a time t1 to a time t2, the speed synchronizing control phase by a period from a time t2 to a time t3, the fastening control phase by a period from a time t3 to a time t4, and the speed change ending phase by a period from a time t4 to a time t5. Further, (A) in FIG. 13 gives the shift load, (B) the assist clutch torque, (C) the input shaft speed and the output shaft speed, (D) the shift position and (E) the output shaft torque.

In the release control phase (time t1 to t2), the shift load shown (A) in FIG. 14 rises up at the time t1, and the assist clutch torque as shown in (B)rises up with a slight lag ($\Delta$tag4), and then, with a slight lag $\Delta$tag3, the shift load shown in (A) rises up. It is noted that the shift load shown in (A) is in the positive direction since the positive is taken in a direction in which the shift position shown in (D) is shifted toward the SF1 side. The rise-up slope (a slope $\theta$g4 in (A) in FIG. 15) of the function g1 in FIG. 9b is set to be equal to the rise-up slope (a slope $\theta$a4 in (B) in FIG. 15) of the function h1 in FIG. 11.

The shift position shown in (D) in FIG. 15 is slightly shifted from the position SF2 toward the position SF3 by the shift load shown in (A). At the time when the assist clutch torque sufficiently rises up so that a substantial part of the torque transmitted by the second drive gear 5, the second driven gear 6 and the first meshing clutch 19 is released (time t6) as shown in (B), the shift position is shifted from the position SF3 to the position SF2, as shown in (D), by the shift load shown in (A). During the period in which the shift position is shifted (time t6 to t2), no step-like change as shown in (E) is caused in the output shaft torque of the transmission, and accordingly, the gear release can be smoothly made with no shock.

As shown in (D) in FIG. 15, when the shift position comes to a position around the position SF2 (time t2), the speed synchronizing control phase is effected. In the speed synchronizing control phase, the input speed is synchronized with a speed corresponding to the next speed shift stage, as shown in (C) in FIG. 15, by the assist clutch torque. At the time when the speed is synchronized (time t3), the shift position shown in (D) is shifted from the position SF2 to the position SF1. At the time t4 when the shift position is shifted to the position SF1 as shown in (D), the speed change ending phase is effected, and accordingly, the assist clutch torque becomes zero as shown in (B). Thus, the speed change control is ended.

As mentioned above, in this embodiment, the shift load is applied before the time (t6) when a substantial part of the torque transmitted by the meshing clutch is released in any one of the cases shown in FIGS. 12 to 15, and at the time when a substantial part of the torque transmitted by the meshing clutch is released, the shift position is shifted to the release position for carrying out the gear release. Thus, even though no evenness and aging effect are present in the characteristics of the engine and the assist clutch, it is possible to avoid lowering the operating function (speed change feeling) without producing a step-like change in torque due to gear release.

Referring to FIG. 16, explanation will be made of the control content upon up-shift from the second stage to the third stage in such a case that a relatively long time elapses for gear release. The control in such a case that a relatively long time elapses, is made by the control process content at steps 804, 806 in FIG. 8.

FIG. 16 shows a time-chart exhibiting the control content of the speed change control by the automobile control apparatus in the first embodiment of the present invention.

Similar to FIG. 12, the release control phase is given by a period from a time t1 to a time t2, the speed synchronizing control phase by a period from a time t2 to a time t3, the fastening control phase by a period from a time t3 to a time t4, and the speed change ending phase by a period from a time t4 to a time t5. Further, (A) in FIG. 16 gives the shift load, (B) the assist clutch torque, (C) the input shaft speed and the output shaft speed, (D) the shift position and (E) the output shaft torque.

In the release control phase (time t1 to t2), the shift load shown (A) in FIG. 16 rises up at the time t1, and the assist clutch torque as shown in (B)rises up with a slight lag ($\Delta$tag5). It is noted that the shift load shown in (A) is in the positive direction since the positive is taken in a direction in which the shift position shown in (D) is shifted toward the SF1 side. The rise-up slope (a slope $\theta$g5 in (A) in FIG. 16) of the function g1 in FIG. 9$b$ is set to be equal to the rise-up slope (a slope $\theta$a5 in (B) in FIG. 16) of the function h1 in FIG. 11.

If a required time of the gear phase becomes longer the predetermined time (Tm-op-mx) becomes longer, the process at step 806 is carried out through the determination at step 804, and accordingly, the shift load is increased as shown in (D) in FIG. 16. Thus, the shift position is shifted from the position SF3 to the position SF2.

As shown in (D) in FIG. 16, when the shift position comes to a position around the position SF2 (time t2), the speed synchronizing control phase is effected. In the speed synchronizing control phase, the input speed is synchronized with a speed corresponding to the next speed shift stage, as shown in (C) in FIG. 16, by the assist clutch torque. At the time when the speed is synchronized (time t3), the shift position shown in (D) is shifted from the position SF2 to the position SF1. At the time t4 when the shift position is shifted to the position SF1, the speed change ending phase is effected, and accordingly, the assist clutch torque becomes zero as shown in (B). Thus, the speed change control is ended.

As mentioned above, even though the required time for the gear release phase is longer that the predetermined time, the gear release can be safely carried out.

Next, referring to FIG. 17, explanation will be made of a third system configuration in an embodiment of the automobile control apparatus in the embodiment of the present invention.

FIG. 17 is a skeleton view illustrating the third system configuration which shows an embodiment of the automobile control apparatus in the embodiment of the present invention. Like reference numerals are used to denote like parts shown in FIG. 1.

This system configuration is the same as that shown in FIG. 1, except that twin clutches are used in comparison with the configuration shown in 1 in which a torque from the engine 1 is transmitted to the transmission input shaft 10 through the engagement of the input disc 2 and the output disc 3 of the input shaft clutch. That is, an input disc 301 in the input clutch is directly coupled wit the engine 1, and a first output disc 302 in the input shaft clutch is directly coupled with a transmission first input shaft 312 while the a second output disc 303 in the input shaft clutch is directly coupled to a transmission second input shaft 304. The transmission second input shaft 304 is hollow, the transmission first input shaft 312 is extended through the hollow part of the transmission second input shaft 304, and accordingly, the motion relative to the transmission second input shaft 304 can be made in the rotating direction. The first drive gear 4, the third drive gear 6 and the fifth drive gear 8 are fixed to the transmission second input shaft 304, and accordingly, they are rotatable with respect to the transmission first input shaft 312. Further, the second drive gear 5 and the fourth drive gear 7 are fixed to the transmission first input shaft 312, but they are rotatable with respect to the transmission second input shaft 304. The engagement and disengagement between the input disc 301 and the first output disc 302 in the input shaft clutch is carried out by an input shaft clutch first actuator 305, and the engagement and disengagement between the input disc 301 in the input shaft clutch and the second disc 303 in the input shaft clutch is carried out by an input shaft clutch second actuator 306.

Further, between the first driven gear 12 and the third driven gear 14, there is provided a first meshing clutch 309 for engaging the first driven gear 12 with the transmission output shaft 18 or engaging the third driven gear 14 with the transmission output shaft 18. Accordingly, a rotating torque transmitted from the first drive gear 4 or the third drive gear 6 to the first driven gear 12 or the third driven gear 14 is transmitted by the first meshing clutch 309, and accordingly, it is transmitted to the transmission output shaft 18 by way of the first meshing clutch 309.

Further, between the second driven gear 13 and the fourth driven gear 15, there is provided a third meshing clutch 311 for engaging the second driven gear 13 with the transmission output shaft 18 or engaging the fourth driven gear 15 with the transmission output shaft 18. Accordingly, a rotating torque transmitted from the second drive gear 5 or the fourth drive gear 7 to the second driven gear 13 or the fourth driven gear 15 is transmitted to the third meshing clutch 311, and accordingly, it is transmitted to the transmission output shaft 18 by way of the third meshing clutch 311.

Further, the fifth driven gear 16 is provided thereto with a second meshing clutch 310 for engaging the fifth driven gear 16 with the transmission output shaft 18. Thus, a rotating torque transmitted from the fifth drive gear 8 to the fifth driven gear 16 is transmitted to the second meshing clutch 310, and accordingly, it is transmitted to the transmission output shaft 18 by way of the second meshing clutch 310.

Thus, with this arrangement, when any one of the first meshing clutch 309, the second meshing clutch 310 and the third meshing clutch 311 is shifted axially of the transmission output shaft 18 so as to fasten any one of the first driven gear 12, the second driven gear 13, the third driven gear 14, the fourth driven gear 15 or the fifth driven gear 16, it is required to transmit a rotating torque of the transmission first input shaft 312 and a rotating torque of the transmission second input shaft 312 to the first meshing clutch 309, the second meshing clutch 310 or the third meshing clutch 311. In order to fasten any one of the first driven gear 12, the second driven gear 13, the third driven gear 14, the fourth driven gear 15 and the fifth driven gear 16 to the transmission output shaft 18, any one of the first meshing clutch 309, the second meshing clutch 310 and the third meshing clutch 311 is shifted, and further, in order to shift the any one of the first meshing clutch 309, the second meshing clutch 310 and the third meshing clutch 311, the shift/select mechanism 313 is actuated by the shift first actuator 23, the shift second actuator 24, the select first actuator 25 or the select second actuator 26.

For example, in such a configuration that the first speed shift stage is effected by transmitting a torque to the transmission output shaft 18 by way of the first drive gear 4 and the first driven gear 12, the third speed shift stage is effected by transmitting a torque to the transmission output shaft 18 by way of the third drive gear 6 and the third driven gear 14, and the fourth speed shift stage is effected by transmitting a torque to the transmission output shaft 18 by way of the fourth drive gear 7 and the fourth driven gear 15, the up-shift speed change from the first speed shift stage to the third speed shift stage or the down-shift speed change from the third speed shift stage to the first speed shift stage can be made by the control similar to that for the assist clutch and the shift in the embodiment shown in FIG. 1 from such a state that the first output disc 302 in the input shaft clutch is released, and the third meshing clutch 311 and the fourth driven gear 15 is engaged with each other.

For example, in such a configuration that the second speed shift stage is effected by transmitting a torque to the transmission output shaft 18 by way of the second drive gear 5 and the second driven gear 13, the fourth speed shift stage is effected by transmitting a torque to the transmission output shaft 18 by way of the fourth drive gear 7 and the fourth driven gear 15, and the fifth speed shift stage is effected by transmitting a torque to the transmission output shaft 18 by way of the fifth drive gear 8 and the fifth driven gear 16, the up-shift speed change from the second speed shift stage to the fourth speed shift stage or the down-shift speed change from the fourth speed shift stage to the second speed shift stage can be made by the control similar to that for the assist clutch and the shift in the embodiment shown in FIG. 1 from such a state that the second output disc 303 in the input shaft clutch is released, and the second meshing clutch 310 and the fifth driven gear 16 is engaged with each other.

With reference to FIG. 18, a fourth configuration of the automobile control apparatus in this embodiment will be explained.

FIG. 18 is a skeleton view illustrating the fourth system configuration in an embodiment of the automobile control apparatus in the embodiment of the present invention. It is noted that like reference numerals are used to denote like parts to those shown in FIG. 1.

This configuration is the same as that shown in FIG. 1, except that the transmission torque changing means is constituted by a motor generator 105, in comparison with the configuration shown in FIG. 1, in which the transmission torque changing means is constituted by input and outputs discs 203, 204 in the assist clutch. That is, the seventh driven gear 202 is meshed with a ring gear 108, and the input shaft 10 is fitted thereon a sun gear 106. Planetary gears 107 incorporating a carrier are meshed with the sun gear 106 and the ring gear 108. The motor generator 105 is coupled with the planetary gears 107, a rotating torque from the input shaft 10 is transmitted to the output shaft 18 by controlling a current running through the motor generator with the use of a motor generator control unit 104. That is, control similar to the assist clutch in the embodiment shown in FIG. 1 is carried out for the motor generator so as to effect the speed change.

As mentioned above, according to the embodiments of the present invention, a load is applied in a direction in which the meshing transmission means is shifted to its release position before the transmission torque is released from the gear train, and accordingly, since a substantial part of a torque from the drive power source can be transmitted by the assist clutch so that the meshing transmission means can be shifted to its release position in such a condition that a transmission torque through gear trains is sufficiently released even though unevenness among drive sources and assist clutches, and aging effect are present, thereby it is possible to prevent speed change feeling from being lowered due to a shock upon gear release.

According to the present invention, the affection due to unevenness among drive power sources and transmission torque changing means, and aging effect can be reduced without using sensors.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of controlling an automobile including a drive power source for producing a drive power, a gear transmission means incorporating a plurality of gear trains, and a plurality of torque transmission means incorporated between a transmission input shaft and a transmission output shaft, at least one of the torque transmission means being a transmission torque changing means and at least one thereof being a meshing transmission means, in which a speed change from one gear train to another gear train is carried out by controlling the transmission torque changing means, comprising the steps of, during gear release in which at least a part of a transmission torque of gear trains is released by transmitting at least part of a torque from the drive power source through the transmission torque changing means to shift the meshing transmission means to a release position for releasing gears, applying a load in a direction in which the meshing transmission means is shifted toward the release position before the transmission torque of the gear trains is completely released, and shifting the meshing transmission means to the release position when at least part of the transmission torque of the gear trains is released.

2. A method of controlling an automobile as set forth in claim 1, wherein the load is applied to the meshing transmission means before at least one of the transmission torque of the gear trains is released.

3. A method of controlling an automobile as set forth in claim 1, wherein the load applied to the meshing transmission means is applied at the same time when the release of at least a part of the transmission torque of the gear train is started.

4. A method of controlling an automobile as set forth in claim 1, further comprising the steps of:

setting a rise-up slope of the transmission torque of the transmission torque changing means, and setting a rise-up slope of the load of the meshing transmission means, wherein the load in the direction in which the meshing transmission means is shifted toward the release position, and the transmission torque of the transmission torque changing means are raised up in accordance with these set slopes.

5. A method of controlling an automobile as set forth in claim 1, wherein a rise-up slope of the transmission torque of the transmission torque changing means is set to be not less than a rise-up slope of the load of the meshing transmission means.

6. A method of controlling an automobile as set forth in claim 1, further comprising the steps of:

setting a maximum required time for gear release of the meshing transmission means; and detecting a required time from the time when the gear release of the meshing transmission means is started, wherein the load in a direction in which the meshing transmission means is shifted toward the release position is enhanced if the required time from the time when the gear release is started, exceeds the maximum required time.

7. A method of controlling an automobile including a drive power source for producing a drive power, a gear transmission means incorporating a plurality of gear trains, two transmission torque changing mean, and a plurality of torque transmission means incorporated between a transmission input shaft and a transmission output shaft, at least one of the torque transmission means being a meshing transmission means, in which a speed change from one gear train to another gear train is carried out by controlling the transmission torque changing means, comprising by the steps of, during gear release in which at least part of a transmission torque of gear trains is released by transmitting at least part of a torque from the drive power source through the transmission torque changing means to shift the meshing transmission means toward a release position for releasing gears, applying a load in a direction in which the meshing transmission means is shifted toward the release position before the transmission torque of the gear trains is released; and shifting the meshing transmission means to the release position when at least part of the transmission torque of the gear trains is released.

8. A method of controlling an automobile including a drive power source for producing a drive power, a gear transmission means incorporating a plurality of gear trains, and a plurality of torque transmission means incorporated between a transmission input shaft and a transmission output shaft, at least one of the torque transmission means being a transmission torque changing means and at least one thereof being a meshing transmission means, in which a speed change from one gear train to another gear train is carried out by controlling a transmission torque of the transmission torque changing means and a load of the meshing transmission means in response to electric signals, comprising by the steps of, during gear release in which at least part of a transmission torque of gear trains engaged with the meshing transmission means is released by transmitting at least a part of a torque from the drive power source through the transmission torque changing means to shift the meshing transmission means to a release position for releasing gears, energizing an electric signal to the meshing transmission means to apply a load in a direction in which the meshing transmission means is shifted toward the release position, and energizing an electric signal to the transmission torque changing means to transmit at least part of the torque from the drive power source through the intermediary of the transmission torque changing means, and shifting the meshing transmission means to the release position when at least part of the transmission torque of the gear trains engaged with the meshing transmission means is released.

9. A method of controlling an automobile including a drive power source for producing a drive power, a gear transmission incorporating a plurality of gear trains, and a plurality of torque transmission means incorporated between a transmission input shaft and a transmission output shaft, at least one of the torque transmission means being a transmission torque changing means and at least one thereof being a meshing transmission means, in which a speed change from one gear train to another gear train is carried out by controlling the transmission torque changing means, comprising the step of, during gear release in which a transmission torque of gear trains is gradually released by gradually transmitting a torque from the drive power source through the intermediary of the transmission torque changing means to shift the meshing transmission means to a release position for releasing gears, applying a load which is greater than a total resisting force against movement of the meshing transmission means during the gear release, in a direction in which the meshing transmission means is previously shifted toward the release position.

10. A method of controlling an automobile as set forth in claim 9, wherein a rise-up slope of the transmission torque of the transmission torque changing means is set to be not less than a rise-up slope of the load of the meshing transmission means.

11. An automobile control apparatus comprising a drive power source for producing a drive power, a gear transmission incorporating a plurality of gear trains, a plurality of torque transmission means incorporated between a transmission input shaft and a transmission output shaft and including a transmission torque changing means and a meshing transmission means, and a speed change control means for controlling the transmission torque changing means to shift from one gear train to another gear train, comprising:

a gear release control means for applying a load in a direction in which the meshing release position is shifted toward the release position, before the transmission torque of the gear trains is completely released, during gear release in which at least a part of a transmission torque of gear trains is released by transmitting at least part of a torque from the drive power source through the intermediary of the transmission torque changing means to shift the meshing transmission means toward a release position for releasing gears, and for shifting the meshing transmission means to the release position when at least a part of the transmission torque of the gear trains is released.

12. A method of controlling a transmission including a plurality of gear trains, and a plurality of torque transmission means provided between a transmission input shaft and a transmission output shaft, at least one of the torque transmission means being a transmission torque changing means and at least one thereof being a meshing transmission means, in which shifting from one gear train to another gear train is carried out by controlling the transmission torque changing means, comprising the steps of, during gear release in which at least a part of a transmission torque of gear trains is released by transmitting at least part of a torque from the drive power source through the intermediary of the transmission torque changing means to shift the meshing transmission means toward a release position for releasing gears, applying a load in a direction in which the meshing transmission means is shifted toward a release position, before the transmission torque of the gear trains is completely released, and shifting the meshing transmission means to the release position when at least part of the transmission torque of the gear trains is released.

13. A transmission having a plurality of gear trains, and a plurality of torque transmission means provided between a transmission input shaft and a transmission output shaft, and a transmission torque changing means and a meshing transmission means, in which shifting from one gear train to another gear train is carried out by controlling the transmission torque changing means, comprising:

a gear release control means for applying a load in a direction in which the meshing transmission means is shifted toward a release position before a transmission torque of gear trains is completely released during gear release in which at least part of a transmission torque of gear trains is released by transmitting at least part of a torque from the drive power source through the intermediary of the transmission torque changing means to shift the meshing transmission means toward a release position for releasing gears, and for shifting the meshing transmission means to the release position when at least part of the transmission torque of the gear trains is released.

14. A vehicle system comprising, a drive power source for producing a drive power, a transmission comprising a plurality of gear trains, a plurality of torque transmission means provided between a transmission input shaft and a transmission output shaft a transmission torque changing means, a meshing transmission means, a speed change control means for controlling the transmission torque changing means so as to carry out shifting from one gear train to another gear train, and a gear release control means for applying a load in a direction in which the meshing transmission means is shifted toward a release position before a transmission torque of gear trains is completely released during gear release in which at least part of a transmission torque of gear trains is released by transmitting at least part of a torque from the drive power source through the intermediary of the transmission torque changing means to shift the meshing transmission means toward a release position for releasing gears, and for shifting the meshing transmission means to the release position when at least part of the transmission torque of the gear trains is released.

* * * * *